(12) United States Patent
Ogasawara et al.

(10) Patent No.: US 8,111,353 B2
(45) Date of Patent: Feb. 7, 2012

(54) LENS ARRAY SHEET, LIGHT SOURCE AND LIQUID CRYSTAL DISPLAY DEVICE

(75) Inventors: Toyokazu Ogasawara, Kanagawa (JP); Tsuyoshi Maeda, Yamanashi (JP)

(73) Assignee: Sony Corporation, Tokyo (JP)

( * ) Notice: Subject to any disclaimer, the term of this patent is extended or adjusted under 35 U.S.C. 154(b) by 380 days.

(21) Appl. No.: 12/419,785

(22) Filed: Apr. 7, 2009

(65) Prior Publication Data

US 2009/0256999 A1    Oct. 15, 2009

(30) Foreign Application Priority Data

Apr. 15, 2008  (JP) ............................ P2008-105980

(51) Int. Cl.
*G02F 1/1335* (2006.01)
(52) U.S. Cl. ............. 349/64; 349/62; 359/455; 359/619
(58) Field of Classification Search ........................ None
See application file for complete search history.

(56) References Cited

U.S. PATENT DOCUMENTS

| | | | |
|---|---|---|---|
| 5,870,224 A | 2/1999 | Saitoh et al. | |
| 6,822,707 B2 * | 11/2004 | Ariyoshi et al. | 349/112 |
| 7,230,757 B2 * | 6/2007 | Kim et al. | 359/446 |
| 7,480,098 B2 * | 1/2009 | Oh et al. | 359/619 |
| 7,515,337 B2 * | 4/2009 | Shinbo | 359/455 |
| 7,706,073 B2 * | 4/2010 | Munro | 359/627 |
| 2001/0012078 A1 * | 8/2001 | Hira et al. | 349/95 |
| 2007/0002583 A1 | 1/2007 | Lee et al. | |
| 2007/0076406 A1 | 4/2007 | Kodama et al. | |
| 2008/0225526 A1 | 9/2008 | Yoshizawa et al. | |
| 2009/0256999 A1 | 10/2009 | Ogasawara et al. | |
| 2009/0268128 A1 | 10/2009 | Yamada | |
| 2011/0069249 A1 | 3/2011 | Shiau et al. | |

FOREIGN PATENT DOCUMENTS

| | | |
|---|---|---|
| JP | 10-123623 A | 5/1998 |
| JP | 10-339915 | 12/1998 |
| JP | 2000-206529 | 7/2000 |
| JP | 2000-284268 | 10/2000 |
| JP | 2001-201611 | 7/2001 |
| JP | 2002-250916 | 9/2002 |
| JP | 2006-162940 | 6/2006 |
| JP | 2006-337459 | 12/2006 |
| JP | 2007-256575 | 10/2007 |

OTHER PUBLICATIONS

Toyokazu Ogasawara et al., U.S. Appl. No. 12/423,117, filed Apr. 14, 2009, entitled "Lens Array, tight Source and Liquid Crystal Display DeVice".

* cited by examiner

*Primary Examiner* — Hemang Sanghavi
(74) *Attorney, Agent, or Firm* — Finnegan, Henderson, Farabow, Garrett & Dunner, L.L.P.

(57) ABSTRACT

A lens array sheet includes a lens layer having a lens surface on which a plurality of lenses are formed in an array, a light reflection layer arranged at an opposite side to the lens surface of the lens layer and having an opening within a light focusing region in the lenses to transmit light, for reflecting light at a site other than the opening, and a light diffusion layer arranged between the lens layer and the light reflection layer, for diffusing light, which passes through the opening and is directed toward the lens layer.

20 Claims, 14 Drawing Sheets

LENS ARRAY SHEET, LIGHT SOURCE AND LIQUID CRYSTAL DISPLAY DEVICE

BACKGROUND OF THE INVENTION

1. Field of the Invention

The present invention relates to a lens array sheet, a light source and a liquid crystal display device.

2. Description of the Related Art

Recently, a liquid crystal panel such as liquid crystal display device has been gradually enlarged. Although the liquid crystal panel may be enlarged, it is not allowed to degrade the image quality of the panel and it is demanded that high definition image quality of the panel can be achieved even for a large-scale screen. In order to achieve the high definition image quality for the large-scale screen, for example, it is strongly demanded that brightness of the screen can be maintained or improved, or viewing angle can be widened. In accordance with these demands, some techniques have been proposed to arrange a micro array lens in the liquid crystal panel and improve the brightness and the viewing angle of the liquid crystal panel. Arranging the micro array lens makes it possible to enhance front face brightness and/or widen the viewing angle.

On the contrary, there is an issue to be solved, because moire fringes may appear and visibility may become lower due to the fact that the liquid crystal panel includes an array of regular pixels (i.e., picture elements). The moire fringes are a fringe pattern which is produced by overlapping a plurality of regular repetitive patterns and visually observed by a deviation of periods between the plurality of regular repetitive patterns. The moire fringes in the liquid crystal panel are produced as each pixel in the liquid crystal panel forms a regular repetitive pattern and other members and the like has a similar regular repetitive structure.

Japanese Patent Application Laid-Open No. 2000-206529 discloses moire fringes as mentioned above and a method of reducing such moire fringes.

An optical sheet having a structured pattern of a regular pitch may be used as a launching member for guiding light from a backlight to a liquid crystal panel. In this case, overlapping of pixels forming the regular pitch of the liquid crystal panel and the structured pattern of the optical sheet overlaps light and dark lattices and causes moire fringes to be produced. A liquid crystal display device disclosed in JP-A No. 2000-206529 is arranged to reduce the moire fringes by configuring an array pitch of pixels and the pitch of the structured pattern of the optical sheet so as to minimize a pitch distance of the moire fringes. In other words, the liquid crystal display device is arranged to reduce effects of the moire fringes on the image quality by minimizing the pitch distance of the moire fringes and thus decreasing the pitch distance to a level not more than resolution of human eye.

SUMMARY OF THE INVENTION

Though the liquid crystal display device described in JP-A No. 2000-206529 may reduce the effects of the moire fringes on visibility and the like, actually the moire fringes may appear. Moreover, it is difficult to adjust the array pitch of the pixels, since there is a need for modifying a design of the liquid crystal panel itself and a manufacturing line of the liquid crystal panel. Thus, a technique has been developed to suppress moire fringes per se from being produced.

JP-A No. 2000-284268 and JP-A No. 2007-256575 disclose some techniques to suppress moire fringes per se from being produced. JP-A No. 2000-284268 and JP-A No. 2007-256575 propose transparent liquid crystal display devices, respectively, in which each of the transparent liquid crystal display devices includes a backlight unit using a brightness control member having a lens array structure containing repetitive lens unit. Each of the liquid crystal display devices includes a liquid crystal panel and a light source unit for emitting light from a back side of (immediately below) the liquid crystal panel. The light source unit also includes a light source, a lens array layer for guiding the light from the light source to the liquid crystal panel, and a light shielding section having an opening arranged close to a focal plane of the lens array layer (i.e., a back surface opposite to a surface on which a lens array is formed). With this arrangement, as described in JP-A No. 2000-284268 and JP-A No. 2007-256575, the moire fringes are suppressed from being produced by converting the light from the light source into parallel light to reduce a structured pattern of an optical sheet.

It is difficult, however, to sufficiently suppress the moire fringes from being produced using the lens array layer as described above. In other words, since the lens array layer per se also has a regular structured pattern and the regular structured pattern has effects on the parallel light, it is difficult to convert the light from the light source into perfectly parallel light.

Therefore, the present invention has been made in view of the above-mentioned issues, and it is desirable to provide a new and improved lens array sheet, light source and liquid crystal display device in which it is possible to suppress degradation of the image quality and reduce effects of moire fringes on the image quality.

According to an embodiment of the present invention, in order to solve the above-mentioned issues, there is provided a lens array sheet including a lens layer having a lens surface on which a plurality of lenses are formed in an array, a light reflection layer arranged at an opposite side to the lens surface of the lens layer and having an opening within a light focusing region in the lenses to transmit light, for reflecting light at a site other than the opening, and a light diffusion layer arranged between the lens layer and the light reflection layer, for diffusing light, which passes through the opening and is directed toward the lens layer.

With this arrangement, light emitted from a side of the light reflection layer to the lens array sheet is in part reflected at the light reflection layer. In addition, a part of the light emitted to the light focusing region in the plurality of lenses passes through the opening. The light having passed through the opening is diffused by the light diffusion layer before the light reaches the lens layer. Then, the diffused light reaches the lens layer and converted into generally parallel light by means of the plurality of lenses. It is noted that the light to be converted into the generally parallel light is diffused. As a result, after conversion into the generally parallel light by means of the lenses, the light turns out to be the generally parallel light, while brightness change of the light between dark and light intensity due to an array pattern of the plurality of lenses in the lens layer is reduced.

The light diffusion layer may also include a plurality of light diffusion portions arranged within the light focusing region in the lenses, for diffusing the light passing through the opening and directing toward the lens layer and transparent portions arranged between the light diffusion portions, for transmitting the light.

Each of the light diffusion portion may also have a shape such that a width of the shape gradually widens as the width approaches to the lens layer.

The lens array sheet may also include a transparent layer arranged between the light diffusion layer and the light reflection layer, for transmitting the light.

The lens array sheet may also include a transparent layer arranged between the lens layer and the light diffusion layer, for transmitting the light.

A haze of the light diffusion layer may be equal to or less than 20%.

The light reflection layer may be a scatter and reflection layer for scattering light in order to reflect the light.

The light reflection layer may not be formed at least around the lens array sheet.

A lenticular lens may also be formed on the lens surface of the lens layer in which the lenticular lens includes a plurality of convex cylindrical lenses arranged in parallel to each other and at a predetermined distance.

According to another embodiment of the present invention, in order to solve the above-mentioned issues, there is provided an optical sheet including a lens array sheet having a lens surface on which a plurality of lenses are formed in an array, and a light diffusion plate arranged at an opposite side to the lens surface of the lens array sheet, for diffusing light directing toward to the lens array sheet, wherein the lens array sheet includes a lens layer having the lens surface, and a light reflection layer arranged at an opposite side to the lens surface of the lens layer and having an opening within a light focusing region in the lenses to transmit light from the light diffusion plate, for reflecting light at a site other than the opening, and a light diffusion layer arranged between the lens layer and the light reflection layer, for diffusing the light passing through the opening and directing toward the lens layer.

The optical sheet may also include a polarization splitting film arranged at a lens surface side of the lens array sheet, for polarization splitting light.

The optical sheet may also include a light diffusion sheet arranged at least one of between the polarization splitting film and the lens array sheet and between the lens array sheet and the light diffusion plate, for diffusing light.

Furthermore, according to another embodiment of the present invention, in order to solve the above-mentioned issues, there is provided a light source including a lens array sheet having a lens surface on which a plurality of lenses are formed in an array, and a backlight arranged at an opposite side to the lens surface of the lens array sheet, for emitting light on the lens array sheet, wherein the lens array sheet includes a lens layer having the lens surface, a light reflection layer arranged at an opposite side to the lens surface of the lens layer and having an opening within a light focusing region in the lenses to transmit the light emitted from the backlight, for reflecting light at a site other than the opening, and a light diffusion layer arranged between the lens layer and the light reflection layer, for diffusing the light passing through the opening and directing toward the lens layer.

Furthermore, according to another embodiment of the present invention, in order to solve the above-mentioned issues, there is provided a liquid crystal display device including a lens array sheet arranged between a liquid crystal panel and a backlight emitting light on the liquid crystal panel and having, at a side of the liquid crystal panel, a lens surface on which a plurality of lenses are formed in an array, wherein the lens array sheet includes a lens layer having the lens surface, a light reflection layer arranged at an opposite side to the lens surface of the lens layer and having an opening within a light focusing region in the lenses to transmit the light emitted from the backlight, for reflecting light at a site other than the opening, and a light diffusion layer arranged between the lens layer and the light reflection layer, for diffusing the light passing through the opening and directing toward the lens layer.

According to the embodiments of the present invention described above, effects of moire fringes on the image quality can be reduced while suppressing the image quality being degraded.

DETAILED DESCRIPTION OF THE PREFERRED EMBODIMENTS

Figure 1:
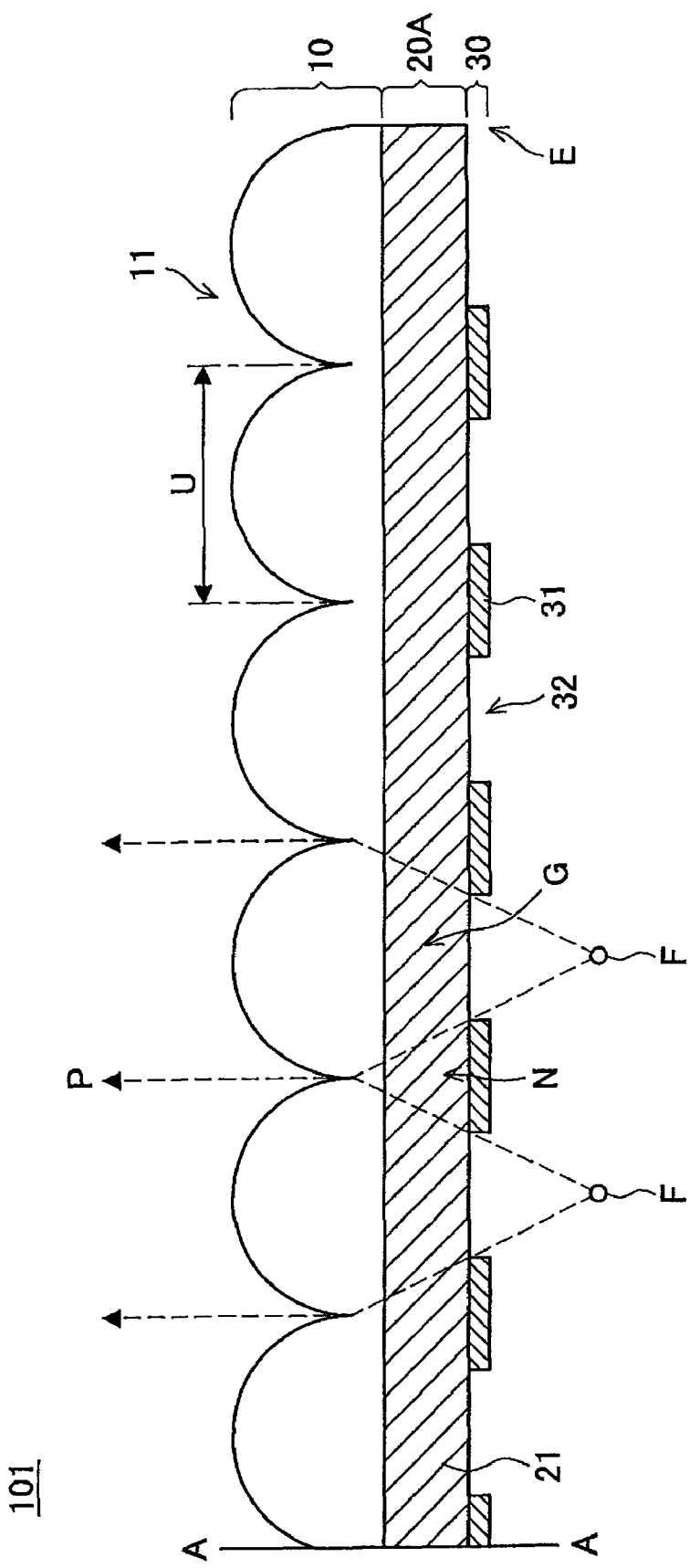
FIG. 1 is an explanatory diagram for explaining a configuration of a lens array sheet according to a first embodiment of the present invention.

Hereinafter, preferred embodiments of the present invention will be described in detail with reference to the appended drawings. Note that, in this specification and the appended drawings, structural elements that have substantially the same function and structure are denoted with the same reference numerals, and repeated explanation of these structural elements is omitted.

First, a lens array sheet according to each of embodiments of the present invention will now be described. Then, an optical sheet, a light source, and a liquid crystal display device using these lens array sheets will be described.

The lens array sheet according to each of the embodiments of the present invention includes a layer or a site for diffusing light, for example, to reduce effects of moire fringes on the image quality while suppressing the image quality from being degraded. In addition, the embodiments of the present invention may be classified into two groups depending on a shape or an arrangement position of a light diffusion layer or site, other structures and the like. Consequently, embodiments (i.e., a first embodiment to a sixth embodiment) concerning one group of the present invention will be first described and other embodiments (i.e., a seventh embodiment to a tenth embodiment) of the present invention will be then described. It is noted that since those embodiments have many common elements, repeated explanation of the same contents in subsequent embodiments will be conveniently omitted and the differences between the embodiments will be described.

Lens Array Sheet 101 According to First Embodiment

Figure 2:
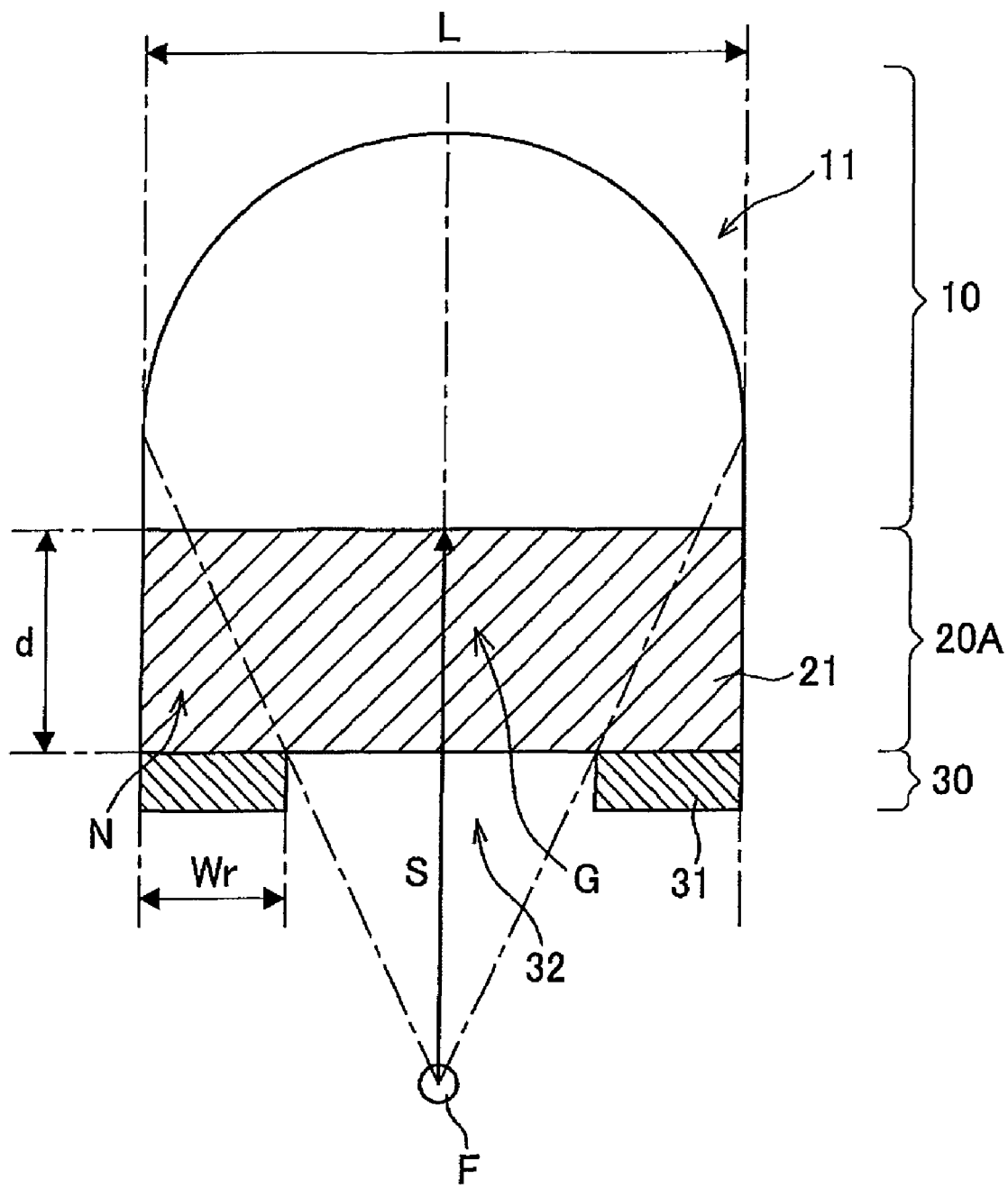
FIG. 2 is an explanatory diagram for explaining a configuration of the lens array sheet according to the embodiment.

Referring to FIG. 1 and FIG. 2, a configuration of a lens array sheet according to the first embodiment of the present invention will now be described. FIG. 1 and FIG. 2 illustrate the configuration of the lens array sheet according to this embodiment. In FIG. 1 and FIG. 2, schematic sectional shape and configuration of the lens array sheet according to this embodiment are shown, respectively. It is noted that the sectional shape of a right-side end portion of the lens array sheet 101 is shown and a part of the lens array sheet 101 located at a left side of a line A-A is omitted in FIG. 1.

<Configuration of Lens Array Sheet 101>

As shown in FIG. 1, the lens array sheet 101 according to this embodiment includes a three-layered structure formed in one piece. That is to say, the lens array sheet 101 includes a lens layer 10, a light diffusion layer 20A, and a light reflection layer 30.

The lens layer 10 has a lens surface 11 on which a plurality of individual lenses (hereinafter, also referred to as "lenses") U are formed in an array. A surface opposite to the lens surface 11 of the lens array sheet 101 has a generally flat shape. Hereinafter, this surface is also referred to as a "flat surface".

In terms of the lens layer 10, for example, one lens array sheet is configured such that the lenses U are formed in a one-dimension array within the lens surface 11 and another lens array sheet is configured such that the lenses U are formed in a two-dimension array within the lens surface 11. On one hand, the lens array sheet in the form of the one-dimension array includes, for example, a lenticular lens array sheet on which convex cylindrical lenses are arranged in one direction in an array within the lens surface 11 and the like. On the other, the lens array sheet in the form of the two-dimension array includes, for example, a lens array sheet on which the lenses U are arranged in a two-dimension array within the lens surface 11 and the like, wherein each of the lenses U has a circular, rectangular, hexagonal, or polygonal shape or the like and is formed of a dome-shaped curved surface.

The plurality of lenses U, which are formed on the lens surface 11 of the lens layer 10, are regularly arranged with a predetermined distance (pitch) either in one direction in case of the one-dimensional array or in two directions in case of the two-dimensional array.

Each of the lenses U has a focal point F on the side of the flat surface. By arranging a light source at the focal point F and emitting light to the lens U, this light is converted into parallel light directing along a normal direction of the lens surface 11 by means of the lens U. In FIG. 1, an optical path P denotes the light to be converted into the parallel light. As to the focal point F and the optical P, it can be said that each of the lenses U focuses the parallel light on the focal point F in case where the parallel light is emitted from the upper part of this drawing. A region through which the light being focused on the focal point F passes is herein referred to as a "light focusing region G". A region other than the light focusing region G is also herein referred to as a "non-light focusing region N". Furthermore, surfaces in parallel with the lens array sheet 101 in the light focusing region and the non-light focusing region are referred to as a "light focusing surface region" and a "no-light focusing surface region", respectively.

The lens layer 10 may be made of a material such as glass and plastic material, but the present invention is not limited to such an example. Examples of the plastic material include, for example, homopolymer or copolymer of acrylic ester or methacrylic ester such as methyl polymethacrylate and methyl polyacrylate, and a resin material of polyester, polycarbonate, polystyrene and the like such as polyethylene terephthalate and polybutylene terephthalate.

The light diffusion layer 20A is laminated on the flat surface of the lens layer 10 and formed integrally with the lens layer 10. In short, the light diffusion layer 20A is arranged between the lens layer 10 and the light reflection layer 30. Thus, the light diffusion layer 20A diffuses light, which passes through the light diffusion layer 20A. A part of the light diffusion layer 20A is herein referred to as a "light diffusion portion 21". To achieve such light diffusion layer 20A diffusing the light, for example, a layer can be used that disperses a diffusion agent in a light transparent resin and utilizes a light scattering effect due to the difference in refractive index between the diffusion agent and the light transparent resin.

On one hand, for example, it is possible to use beads or filler, or hollow beads mainly containing acryl resin, polystyrene, polyethylene, urea resin, urethane resin, organic silicone resin, calcium carbonate, titanium oxide, silica and the like as the diffusion agent. Desirably, an average particle size of the diffusion agent is, for example, in the range of about 1 to 50 μm so that the diffusion agent is easy to use. In addition, a combination of two or more kinds of diffusion agents may be used having different types and particle sizes.

On the other, for example, it is possible to use polyester resin, acrylic resin, polystyrene resin, polyvinyl chloride resin, polyvinylidene chloride resin, polyethylene resin, polypropylene resin, polyurethane resin, polyamide resin, polyvinyl acetate resin, polyvinyl alcohol resin, epoxy resin, cellulose resin, silicone resin, polyimide resin, polysulfone resin, polyarylate resin and the like as the light transparent resin.

In addition, preferably, a material having refractive index lower than that of the lens layer 10 may be used as the light transparent resin among the above-mentioned materials. Using such material enables a light beam to be directed more closely to a normal direction of the sheet due to the difference in the refractive index, as the light is incident from the light diffusion layer 20A to the lens layer 10. Therefore, the lens U in the lens layer 10 can work just as designed to develop lens effects (including an effect of changing an optical path and the like).

In addition, preferably, the light diffusion layer 20A has a haze of not more than 20%. In case of the haze being above 20%, since a light diffusion effect of the haze on the light diffusion layer 20A becomes stronger and an amount of light passing through the lens array sheet 101 decreases, front face brightness may probably goes down. Furthermore, in case of the haze being above 20%, it may be difficult to achieve a light focusing effect via the lens layer 10. In addition, a haze value of the light diffusion layer 20A may be adjusted by selecting materials of the diffusion agent and the light transparent resin, respectively, and adjusting the average particle size of the diffusion agent.

The light reflection layer 30 is laminated on a surface opposite to a surface that contacts with the lens layer 10 of the light diffusion layer 20A, and formed integrally with the light diffusion layer 20A. In short, the light reflection layer 30 is arranged at a side of the surface opposite to the lens surface 11 of the lens layer 10. Then, the light reflection layer 30 reflects light at the light reflection portion 31. In this case, the light reflection portion 31 may be formed as a scattering reflection layer, for example, that reflects light by scattering the light. Although, such light reflection portion 31 that reflects the light may be, for example, made of a metal material such as aluminum, silver, zinc, and the like, various materials may be used as the material of the light reflection portion 31, the present invention is not limited to such an example.

The light reflection layer 30 has an opening 32 through which light passes. In short, light emitted from the lower part of this drawing passes through the opening 32 and reaches the light diffusion layer 20A. The light diffusion layer 20A then diffuses light that passes through the opening 32 and directs toward the lens layer 10.

The opening 32 is formed within the light focusing region of the lens U at a location corresponding to a top site of the lens U. In this case, desirably, the opening 32 is not formed in the non-light focusing region. That is to say, for example, in the case where light is emitted by arranging a light source at a focal point F, the opening 32 is configured such that it transmits at least a part of one light passing through the light focusing region G of each of the lenses U and does not transmit the other light including light that passes through the non-light focusing region N. As shown in FIG. 1, the opening 32 transmits all of lights that run through the light focusing region, but a size of the opening 32 according to this embodiment is not limited to such an example. For example, the size of the opening 32 may be such that it does not transmit the light that passes through the non-light focusing region N or such that it transmits the part of the light that passes through the light focusing region G. If the size of the opening 32 is sufficiently large so as to reach the non-focusing region N, then a light component that can be rarely sufficiently restricted is increased. In this case, a light component that is not converted into parallel light by the lens U (i.e., light that is not emitted along a normal direction of the sheet) increase. To the contrary, if the size of the opening 32 is made small even within the light focusing region G, a light component, which is restricted to the focal point F in a more uniform way, is incident on the lens U and light emitted from the lens layer 10 more and more approximates parallel light. In this case, however, a variation of an amount of an emitted light may probably increase. Therefore, shapes and sizes of the lens U and the opening 32, respectively, are desirably determined based on performance requested for the lens array sheet 101 (i.e., conversion efficiency, an amount of light to be transmitted (front face brightness) and the like), a size of the lens array sheet 101 or a positional relation between the lens array sheet 101 and the light source and the like. Thus, sectional shapes of the lens U and the opening 32, respectively, may be any shape such as square, circle, ellipse, rectangular, diamond, polygon or the like. Furthermore, the sectional shapes of the lens U and the opening 32, respectively, may be, for example, formed in a band shape that is continuously extended along one direction (such lens is referred to as a lenticular lens). In other words, the shape of the opening 32 may be formed in a shape corresponding to a light focusing surface of the lens U.

Since the light reflection layer 30 has this opening 32, the light reflection layer 30 can mainly transmit light, which is to be converted into generally parallel light by the lens U, that is to say, which approximately passes through the focal point F and reflect many other lights that would not be converted into the generally parallel light. Therefore, since the lens array sheet 101 has the light reflection layer 30, the lens array sheet 101 can enhance an effect of the lens layer 10 and convert the light into the generally parallel light.

In addition, the light reflection layer 30 (light reflection portion 31) that reflects light is, desirably, not formed at an end, that is to say, at a periphery E of the lens array sheet 101. In other words, it can be said that the light reflection layer 30 has another opening at the periphery E of the lens array sheet 101. An amount of light passing through the periphery E of the lens array sheet 101 is expected to be less than that of light passing through a center of the lens array sheet 101. Therefore, the light reflection layer 30 does not reflect the light passing through the periphery E so that it can suppress a reduction of the amount of the light in the periphery E. In addition, the light focusing effect that converts the light into the generally parallel light by the lens layer 10 is weakened by suppressing the light reflection layer 30 from being formed on the periphery E. As a result, a production of moire fringes would also be restricted in the periphery E. In addition to the light reflection layer 30, the lens U of the lens layer 10 may be omitted from the periphery E of the lens sheet array 101.

<Example of Dimensions for Lens Array Sheet 101>

Hereinbefore, a configuration of the lens array sheet 101 according to this embodiment have been described. Referring to FIG. 2, exemplary dimensions of each of configurations in this lens array sheet 101 will now be described.

In FIG. 2, a lens layer 10, a light diffusion layer 20A and a light reflection layer 30 corresponding to one lens U are shown. A width of a single lens is denoted by L, a distance from a flat surface of the lens layer 10 to a focal point F is denoted by S, a thickness of the light diffusion layer 20A is d, and a width of a light reflection portion 31 corresponding to the single lens U is denoted by Wr. The width Wr of the light reflection portion 31 then can be set to satisfy the following condition (Formula 1).

$$Wr \geq \begin{cases} \dfrac{L \times d}{2 \times S} & \ldots \text{ in case } S \geq d \\ L\left(1 - \dfrac{d}{2 \times S}\right) & \ldots \text{ in case } S \leq d \end{cases} \quad \text{(Formula 1)}$$

(Example of Method for Forming Lens Array Sheet 101)

Hereinafter, an example of a method for forming a lens array sheet 101 according to this embodiment will be described. The method for forming the lens array sheet as described herein is merely one example, but is riot intended to limit the present invention. Naturally, the lens array sheet 101 may be formed using various other methods. In addition, an example in which a lenticular lens array is used as the lens layer 10 is described, different lenses U having other shapes can also be formed.

First, the lens layer 10 is formed.

The method for forming the lens layer 10 may be any methods including, for example, a method using a mold having a shape corresponding to the lens U, a method for transferring a shape of an nickel stamper having a shape corresponding to the lens U by a heating press process, a method for applying an ultraviolet curing resin or an electron curing resin on a transparent substrate etc., embossing the resin by an embossing roll of a shape corresponding to the lens U, and thereafter curing the resin using ultraviolet ray or electron ray, and a method for forming a lens by forming a photoresist pattern with a pitch of the lens U by photolithography and heating and melting the photoresist, and the like.

Next, the light diffusion layer 20A is laminated on a flat surface opposite to the lens surface 11 of the lens layer 10. In short, the light diffusion layer 20A is formed integrally with the lens layer 10 by either applying a material of the light diffusion layer 20A on the lens surface 11 and curing the material or laminating cured layers.

Thereafter, the light reflection layer 30 having the light reflection portion 31 and the opening 32 is also laminated on the light diffusion layer 20A. A method for forming the light reflection layer 30 includes, for example, laminating an ultraviolet curing resin film on the light diffusion layer 20A to form an adhesive ultraviolet curing resin layer. Then, a parallel ultraviolet light is emitted to the lens surface 11. As a result, the ultraviolet curing resin layer in a light focusing region G to which the parallel light is emitted is cured. A transfer sheet, on which a metal material forming the light reflection layer has been applied, is then pressurized such that the metal material is opposite to the ultraviolet curing resin layer. After that, by peeling the transfer sheet, the metal material (light reflection portion 31) is attached to a non-light focusing region N using an adhesive of the ultraviolet curing resin layer in a non-curing part. The non-curing part of the ultraviolet curing resin layer is then exposed to a ultraviolet light so that the non-curing part can be cured. During this time, the ultraviolet light may be radiated, for example, from an opposite side of the lens surface 11. Consequently, the light reflection layer 30 having the opening 32 in the light focusing region G is formed integrally at a back side of the light diffusion layer 20A (a surface opposite to the lens layer 10).

The method for forming the lens array sheet 101 is described by way of example only, as described above, and is not indented to limit the present invention. In addition, forming the light reflection layer 30 is herein described in terms of using the ultraviolet curing resin, but the light reflection layer 30 can be formed by various ways such as a photolithography method, a metal evaporation method, a metal printing method, a transfer method, a sputtering method, an ion plating method, a method for laminating predetermined shaped metals, and the like.

(Example of Advantages of Lens Array Sheet 101)

The configuration of the lens array sheet 101 according to the first embodiment of the present invention have been described as above. With this lens array sheet 101, for example, when the light source is arranged at the side of the light reflection layer 30 and the light is emitted from the light source, light incident on the lens layer 10 is restricted to the focal point F. Thus, the lens array sheet 101 enables the generally parallel light to be emitted from a direction of the lens surface 11 of the lens layer 10. In this case, the emitted generally parallel light includes light diffused by the light diffusion layer 20A. Therefore, the lens array sheet 101 can reduce light having a similar pattern as a regular pattern of the lens U or a pattern of the light reflection layer 30 and included in the generally parallel light (i.e., the lens array sheet 101 can reduce a pattern of brightness uniformity, a directional pattern or the like). As a result, even if, for example, a liquid crystal panel is arranged in front of the lens array sheet 101, the lens array sheet 101 can reduce a regular light pattern, which produces moire fringes with a regular structured pattern of the liquid crystal panel, and can suppress the moire fringes from being produced.

Advantages of the lens array sheet, such as suppression of the moire fringes and the like, will be described in detail with reference to an example in which the lens array sheet 101 is used for a liquid crystal display device.

A usual liquid crystal display device has a liquid crystal panel and a light source emitting light to the liquid crystal panel. In addition, it is desirable that the light is restricted to a direction towards a front surface of the liquid crystal display device in order to improve visibility of the liquid crystal display device. As mentioned above, the lens array sheet 101 according to this embodiment can irradiate the light, which is restricted to the focal point F by the light reflection layer 30, on the lens layer 10 so that the generally parallel light can be emitted from the lens layer 10. Thus, the lens array sheet 101 can improve the visibility of the liquid crystal display device.

In this case, the liquid crystal display device has regularly arranged pixels. Thus, moire fringes can be produced when an arrangement pitch of the pixels and the structured pattern of the lens array sheet overlap. In this case, if a light focusing effect of the lens of the lens array sheet were uniformly achieved, then production of the moire fringes would be rather facilitated. However, the lens array sheet 101 according to this embodiment has the light diffusion layer 20A between the light reflection layer 30 and the lens layer 10. This light diffusion layer 20A diffuses light incident on the lens layer 10. In this manner, since the diffused light is incident on the lens layer 10, the light focusing effect of the lens decreases and the moire fringes are suppressed from being produced.

However, if the light focusing effect of the lens (a bright improving effect, a light distribution effect or the like) is too much suppressed, then a component of the generally parallel light, which is emitted from the lens array sheet, may decrease, an amount of the light, which may be emitted to a front surface of the liquid crystal display device, and visibility of the liquid crystal may be degraded. To the contrary, in the lens array sheet 101 according to this embodiment, the light diffusion layer 20A diffuses light directing toward the lens layer 10 after the light has been restricted to the focal point F by the light reflection layer 30 and immediately before the light is incident on the lens layer 10. Therefore, the light incident on the lens layer 10 would not be significantly diffused. Consequently, the lens array sheet 101 can maintain the light focusing effect of the lens to the extent that the visibility is not degraded while suppressing the moire fringes from being produced.

In addition, it is also conceivable that a light diffusion plate is arranged outside the lens array sheet 101 in order to diffuse light if it is solely intended to cancel parallel light and suppress moire fringes from being produced. In this case, with regard to an arrangement position of the light diffusion plate being arranged outside the lens array sheet, it is conceivable that the light diffusion plate may be arranged on a side of the lens surface 11 of the lens layer 10 or on a side of the light reflection layer 30. However, if sufficiently many diffusion plates, which diffuse light, to suppress the moire fringes from being produced is arranged out side the lens array sheet 101, a number of interfaces between layers increase. As a result, due to reflection on the interfaces between the layers, an amount of light, which follows an unexpected optical path, significantly increase so as to suppress effects such as a light focusing effect of the lens etc., a brightness improving effect, a light distribution effect or the like, and light use efficiency would be reduced. In addition, if these effects are reduced, it becomes difficult to determine a correlation between design factors and the effects, and thereby complicate the design of the lens array sheet itself. Consequently, it would be difficult to provide an optimal structure. To the contrary, in case of the lens array sheet 101 according to this embodiment, the optical path will not be extremely complicated by providing the light diffusion layer 20A between the lens layer 10 and the light reflection layer 30. Therefore, it is possible to appropriately suppress the moire fringes from being produced without encountering the above-mentioned issues.

Differently from this embodiment, in case where the light diffusion plate for diffusing the light is arranged outside on the side of the lens array sheet 101, it leads to an increase of manufacturing cost as a number of members increase by one. In addition, in case where, for example, the light diffusion plate is arranged out side of the lens surface 11 of the lens layer 10, a generally parallel light component will decrease. Therefore, the visibility of the liquid crystal display device probably degrade. However, the lens array sheet 101 according to this embodiment has the light diffusion layer 20A between the lens layer 10 and the light reflection layer 30, thereby avoiding the above-mentioned issues.

In addition, in case where the light diffusion plate is arranged outside on the of the light reflection layer 30, the light widely scattered by the light diffusion plate passes through an opening 32, which is different from a desired opening 32, or be incident on a lens U, which is different from a lens U corresponding to the opening 32 through which the light passes. As a result, the effect that the light is restricted to the focal point F by the light reflection layer 30 will be weakened and some effects such as a light focusing effect of the lens layer 10 will be also weakened. From this point of view, a position, at which the light is diffused, is preferably located near (in particular, immediately in front of) the lens layer 10 as illustrated in this embodiment. According to the light diffusion layer 20A of this embodiment, it is possible to diffuse light, while suppressing the light from being incident on a lens U, which is different from a lens U corresponding to an opening 32 through which the light passes.

An example of the advantages of the lens array sheet 101 according to this embodiment as herein described is also true for other embodiments as described hereinafter. Therefore, for an explanation of the other embodiments described below, in addition to the advantages of the lens array sheet 101 according to this embodiment, further advantages of it will now be explained.

Hereinbefore, the lens array sheet 101 according to the first embodiment of the present invention has been described. In addition, in the context of this lens array sheet 101, it has been described that a haze value of the light diffusion layer 20A may be adjusted by selecting a material of the light diffusion layer 20A and the like. However, an available material of the light diffusion layer 20A may be limited depending on, for example, cost of the material, unavailability of the material, convenience of the design, and the like. When a thick of the light diffusion layer 20A becomes very thick, diffusion property of the light diffusion layer 20A becomes too high to control the light. That is to say, light rather than light directing toward a desired direction would be incident on the lens U. In these cases, other embodiments, in which the haze value and the diffusion property are, in particular, controlled usefully and appropriately and other advantages are achieved, will now be described with reference to FIG. 3.

Lens Array Sheet 102 According to Second Embodiment

Figure 3:
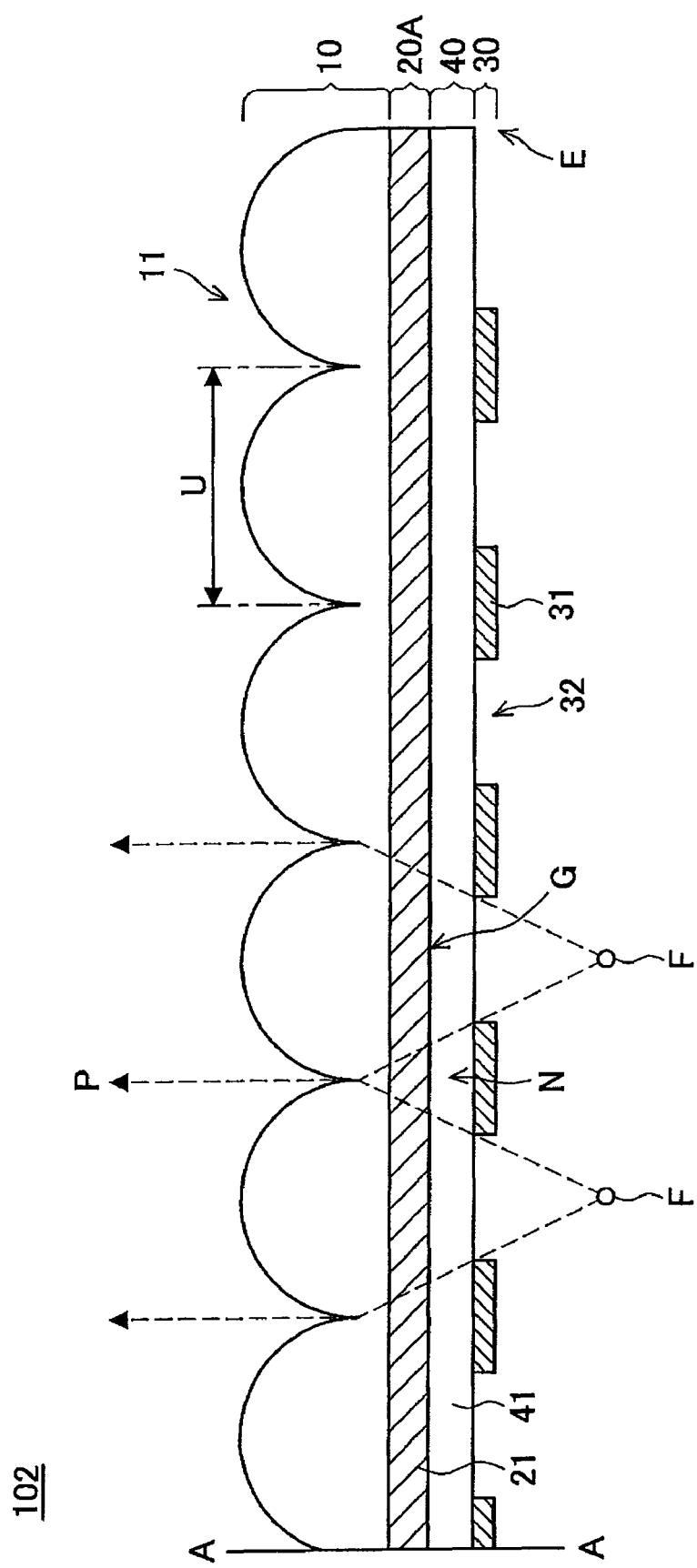
FIG. 3 is an explanatory diagram for explaining a configuration of a lens array sheet according to a second embodiment of the present invention.

FIG. 3 is an explanatory diagram for explaining a configuration of a lens array sheet 102 according to a second embodiment of the present invention.

(Configuration of Lens Array Sheet 102)

As shown in FIG. 3, the lens array sheet 102 according to this embodiment includes a transparent layer 40 in addition to configurations included in the lens array sheet 101 according to the first embodiment.

The transparent layer 40 is arranged between a light diffusion layer 20A and a light reflection layer 30 and formed integrally with the light diffusion layer 20A and the light reflection layer 30. In addition, the transparent layer 40 transmits light between the light diffusion layer 20A and the light reflection layer 30. A part of the transparent layer 40 is herein also referred to as a "transparent portion 41". Though the transparent portion 41 is shown such that it is arranged between the light diffusion layer 20A and the light reflection 30 with reference to this embodiment, the transparent portion 41 may be arranged, for example, between a lens layer 10 and the light diffusion layer 20A.

The transparent layer 40 may be made of a material such as glass and plastic material as is the case with the lens layer 10, but the present invention is not limited to such an example.

(Example of Method for Forming Lens Array Sheet 102)

Such transparent layer 40 may be formed, for example, by laminating the transparent layer 40 on the light diffusion layer 20A before forming the light reflection layer 30 in the lens array sheet 101 according to the first embodiment. Of course, the method for forming the lens array sheet is not intended to limit the present invention.

(Example of Advantages of Lens Array Sheet 102)

Hereinbefore, a configuration of the lens array sheet 102 and the like according to the second embodiment of the present invention have been described. This lens array sheet 102 has an advantage in that it enables a haze value of the light diffusion layer 20A to be adjusted without changing a total thickness of the lens array sheet 102 by adjusting a thickness of the light diffusion layer 20A in addition to the advantages achieved by the lens array sheet 101 according to the first embodiment. The lens array sheet 102 also makes it possible to make use of effects, such as a reflection effect, a diffusion effect and the like, which utilize a further added interface between the light diffusion layer 20A and the transparent layer 40.

Figure 4:
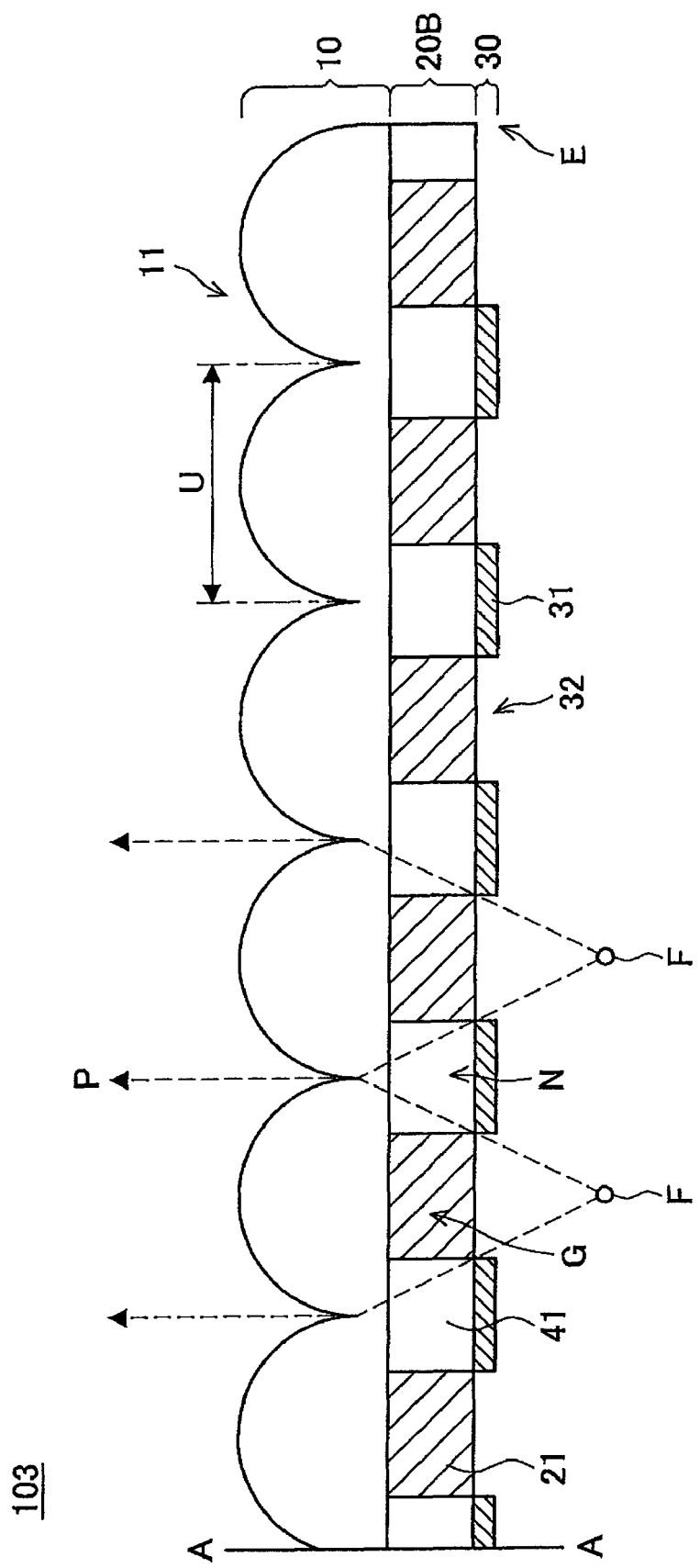
FIG. 4 is an explanatory diagram for explaining a configuration of a lens array sheet according to a third embodiment of the present invention.

Referring to FIG. 4, a third embodiment making use of such interface will now be described.

Lens Array Sheet 103 According to Third Embodiment

FIG. 4 is an explanatory diagram for explaining a configuration of a lens array sheet according to a third embodiment of the present invention.

(Configuration of Lens Array Sheet 103)

A lens array sheet 103 according to this embodiment includes a light diffusion layer 20B in place of the light diffusion layer 20A included in the lens array sheet 101 according to the first embodiment. The light diffusion layer 20B has a light diffusion portion 21 similar to a part of the light diffusion layer 20A according to the first embodiment and a transparent portion 41 similar to a part of the transparent layer 40 according to the second embodiment.

In one hand, the light diffusion portion 21 is arranged in a light focusing region G of a lens U and diffuses light passing through an opening 32 of a light reflection layer 30 and directing toward a lens layer 10. On the other, the transparent portion 41 is arranged between light diffusion portions 21 and transmits the light.

(Example of Method for Forming Lens Array Sheet 103)

Such light diffusion layer 20B may be formed, for example, by forming the light diffusion layer 21 and forming the transparent portion 41 between the light diffusion portions 21 before forming the light reflection layer 30 in the lens array sheet 101 according to the first embodiment. In addition, the light diffusion portion 21 may be either formed by removing a part of the light diffusion layer 20A using a photolithography or sputtering method, or formed by using other printing method, transfer method or the like. Alternatively, it is possible to firstly form the light diffusion layer 20B and then form the lens layer 10 and the light reflection layer 30. Of course, the method for forming the lens array sheet is not intended to limit the present invention.

(Example of Advantages of Lens Array Sheet 103)

Hereinbefore, a configuration of the lens array sheet 103 and the like according to the third embodiment of the present invention has been described. This lens array sheet 103 has an advantage in that it enables a haze value of the light diffusion layer 20B to be adjusted without changing a total thickness of the lens array sheet 103 by adjusting a width of the light diffusion portion 21 in addition to the advantage achieved by the lens array sheet 101 according to the first embodiment. In addition, the lens array sheet 103 forms two interfaces between light focusing regions of one lens U and the other lens U, as the lens array sheet 103 has the transparent portion 41 between one and the other lenses U. These interfaces enable a part of light which is reflected from one of the light diffusion portions 21 and directs to a lens U other than a lens U corresponding to the one of the light diffusion portions 21, to be reflected toward the lens U corresponding to the one of them. Therefore, the lens array sheet 103 enables a light use efficiency to be improved and also enables a light focusing effect of the lens layer 10 to be improved.

In addition, it is possible to combine the lens array sheet 103 according to this embodiment with a configuration of the lens array sheet 102 according to the second embodiment of the second embodiment. For this purpose, a fourth embodiment and a fifth embodiment of the present invention will be now described, which combine those lens array sheet as described above, respectively.

Lens Array Sheets 104 and 105 According to Fourth and Fifth Embodiments

Figure 5:
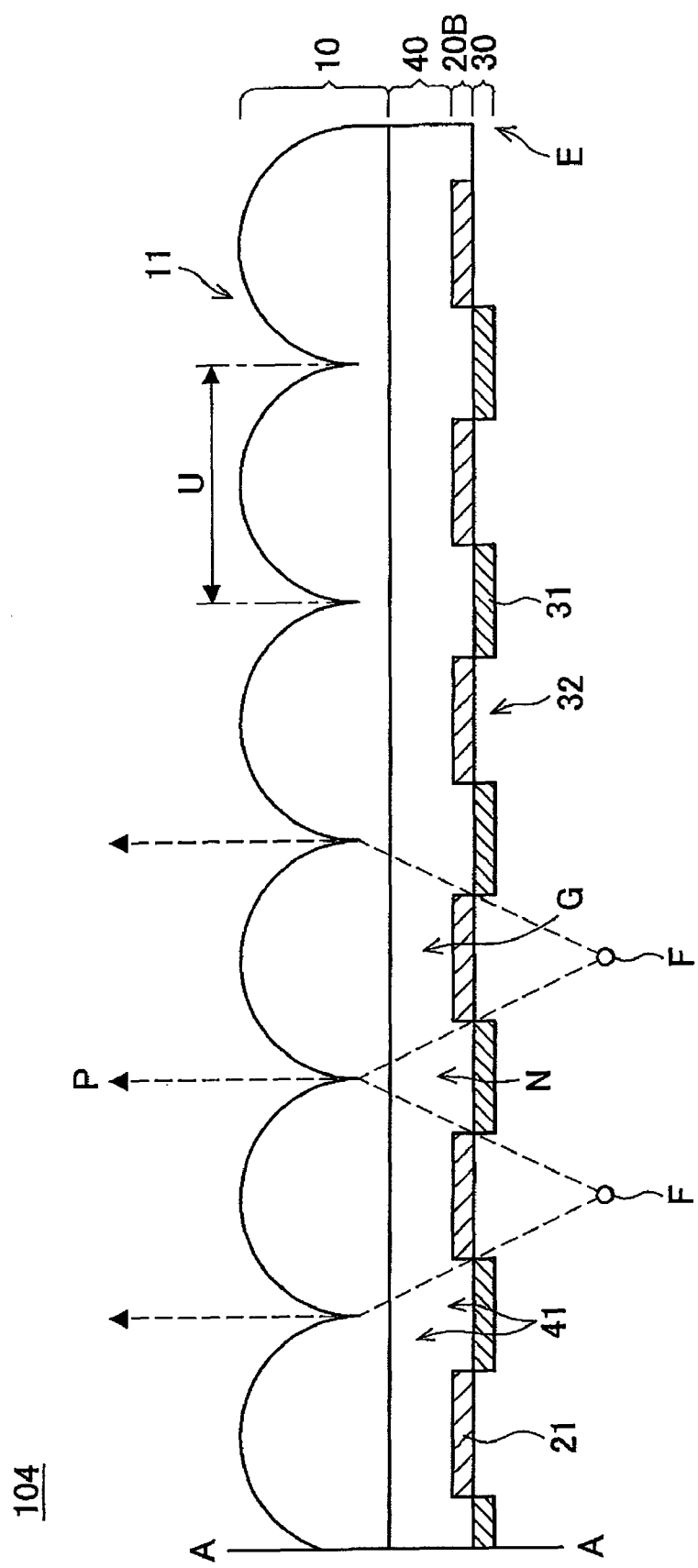
FIG. 5 is an explanatory diagram for explaining a configuration of a lens array sheet according to a fourth embodiment of the present invention.
Figure 6:
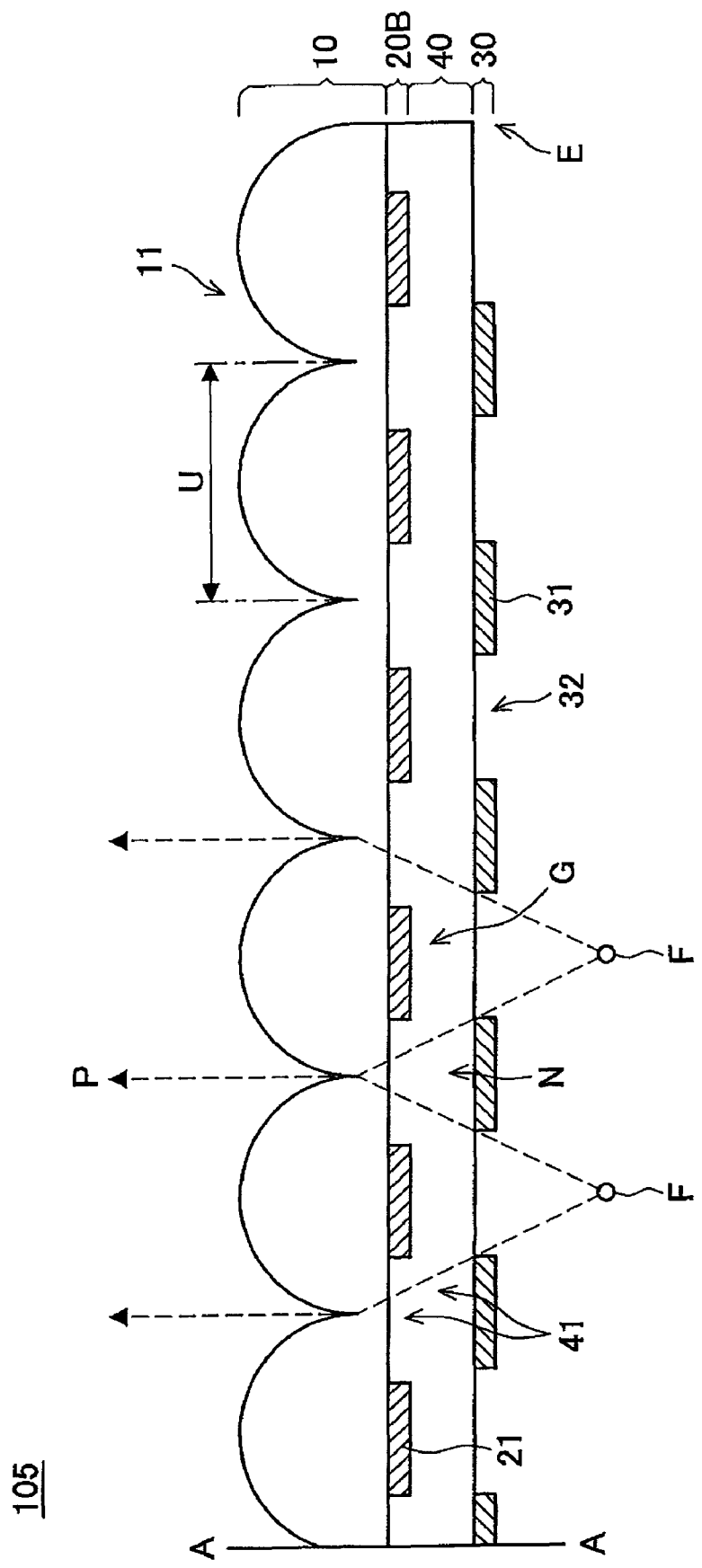
FIG. 6 is an explanatory diagram for explaining a configuration of a lens array sheet according to a fifth embodiment of the present invention.

FIG. 5 is an explanatory diagram for explaining a configuration of a lens array sheet according to a fourth embodiment of the present invention. FIG. 6 is an explanatory diagram for explaining a configuration of a lens array sheet according to a fifth embodiment of the present invention.

(Configuration of Lens Array Sheets 104 and 105)

On one hand, a lens array sheet 104 according to the fourth embodiment has a transparent layer 40 between a lens layer 10 and a light diffusion layer 20B, as shown in FIG. 5. On the other, as shown in FIG. 6, a lens array sheet 105 has a transparent layer 40 between a light diffusion layer 20B and a light reflection layer 30.

(Example of Method for Forming Lens Array Sheets 104 and 105)

Such lens array sheets 104 and 105 can be formed by combining a method for forming a lens array sheet 102 according to the second embodiment and a method for forming a lens array sheet 103 according to the third embodiment. Of course, the method for forming the lens array sheets 104 and 105 is not intended to limit the present invention.

(Example of Advantages of Lens Array Sheets 104 and 105)

Hereinbefore, a configuration of the lens array sheet 104 and 105 and the like according to the fourth and fifth embodiments of the present invention, respectively, have been described. These lens array sheets 104 and 105 can have advantages resulting from a combination of the advantages achieved by the lens array sheet 102 according to the second embodiment and the lens array sheet 103 according to the third embodiment, respectively. In particular, in case of the lens array sheet 105 according to the fifth embodiment, the light diffusion portion 21 diffuses light immediately before the light is incident on the lens layer 10. Therefore, it becomes less likely that light passing through an opening 32 may penetrate into a lens U other than a lens U corresponding the opening 32, and the light diffusion portion 21 also enables a light use efficiency to be improved.

In the above mentioned third, fourth and fifth embodiments, it is shown that a light diffusion portion 21 is not a single layer, but has a transparent portion 41 inserted between layers of the light diffusion portion 21, and a shape of the light diffusion portion 21 (i.e., a shape of the transparent portion 41) is not particularly limited. However, by changing the shape of the light diffusion portion 21, a further advantage can be achieved. Then, referring to FIGS. 7 and 8, a sixth embodiment will now be explained in which the sixth embodiment is based on the third embodiment and is modified such that a shape of the light diffusion portion 21 is changed. Of course, the fourth embodiment and the fifth embodiment other than the third embodiment may be similarly modified.

Lens Array Sheet 106 According to Sixth Embodiment

Figure 7:
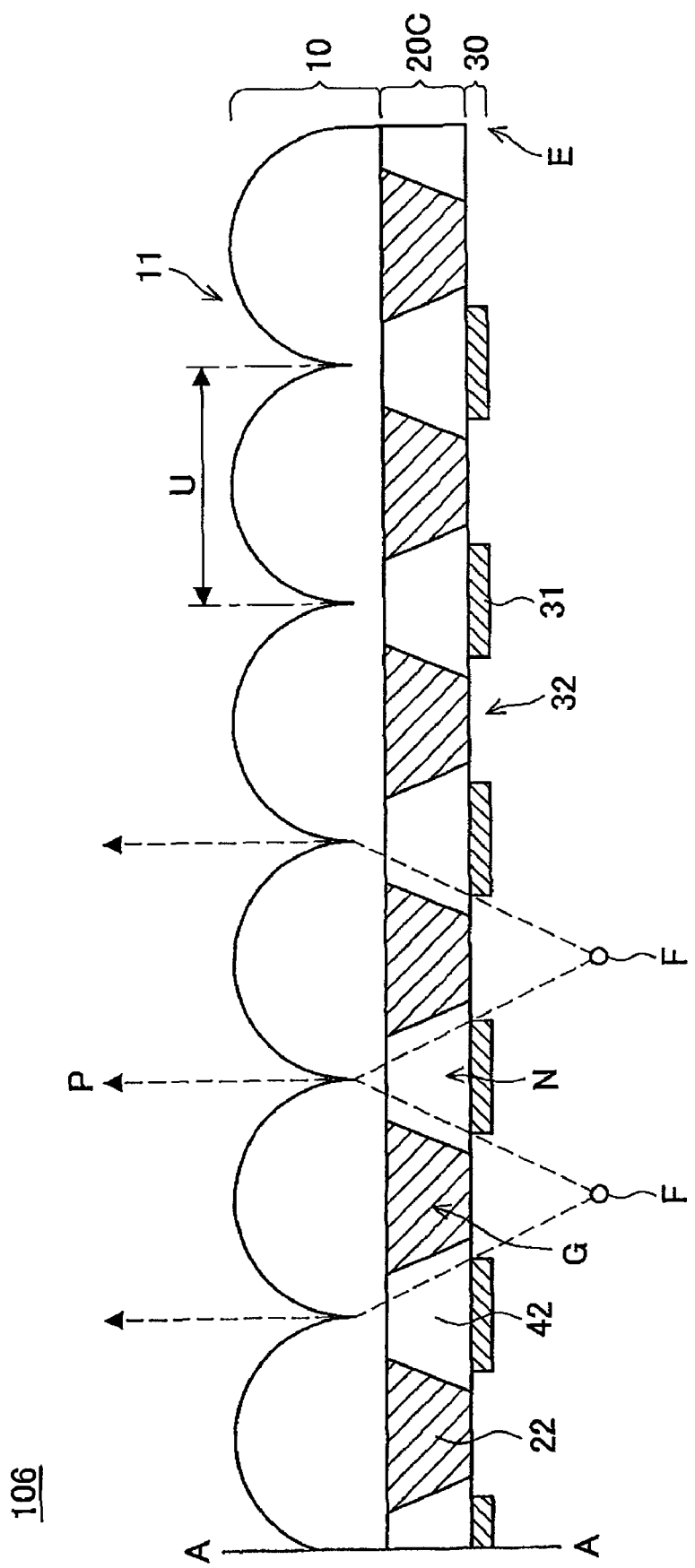
FIG. 7 is an explanatory diagram for explaining a configuration of a lens array sheet according to a sixth embodiment of the present invention.

FIG. 7 is an explanatory diagram for explaining a configuration of a lens array sheet according to a sixth embodiment of the present invention.

(Configuration of Lens Array Sheet 106)

A lens array sheet 106 according to this embodiment has a light diffusion layer 20C in place of a light diffusion layer 20B included in a lens array sheet 103 according to the third embodiment as shown in FIG. 7. In addition, the light diffusion layer 20C has a light diffusion portion 22 and a transparent portion 42.

The light diffusion portion 22 may be formed as in the case of the light diffusion portion 21, as described above, except for its shape and correspondingly the transparent portion 42 may be formed as in the case of the transparent portion 41, as described above, except for its shape.

The light diffusion portion 22 is arranged in a light focusing region G of a lens U and has a shape (a width in a direction of a plane in a lens array sheet 106) gradually widening toward a lens layer 10. In other words, the light diffusion portion 22 has a shape following the light focusing region G in the light focusing region of individual lenses U. In short, for example, the light diffusion portion 22 may be formed in a truncated cone shape when a section of the lens U is circular and formed in a polygonal frustum shape when the section of the lens U is polygonal. In addition, the light diffusion portion 22 diffuses light passing through an opening 32 of a light reflection layer 30 and directing toward the lens layer 10. Furthermore, the transparent portion 42 is arranged between light diffusion portions 21 and transmits light.

(Example of Dimensions of Lens Array Sheet 106)

Hereinbefore, a configuration of the lens array sheet 106 according to this embodiment have been described.

Figure 8:
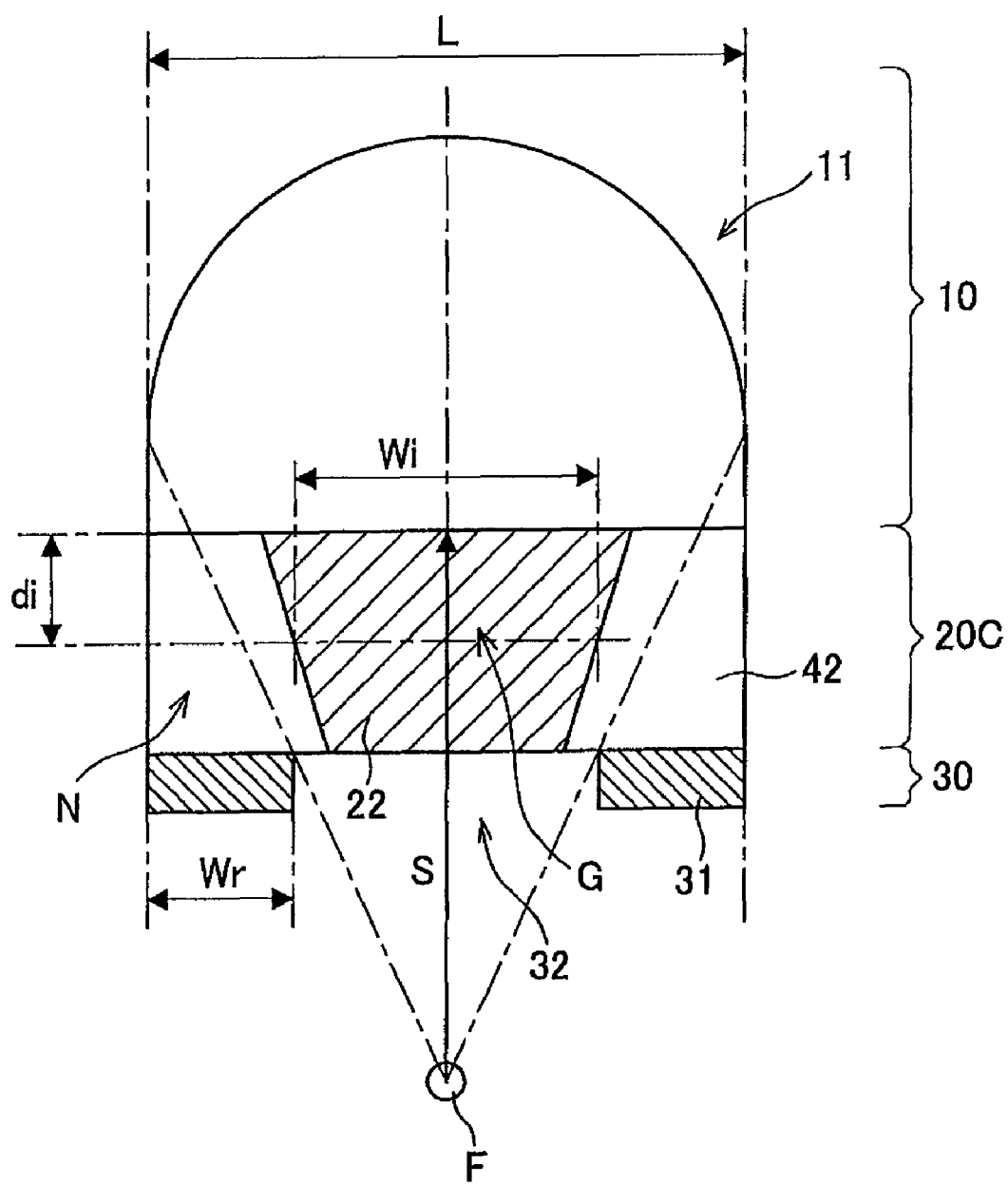
FIG. 8 is an explanatory diagram for explaining a configuration of the lens array sheet according to the embodiment.

Referring to FIG. 8, an example of dimensions of individual configurations in the lens array sheet and the like will now be described.

FIG. 8 illustrates a lens layer 10, a light diffusion layer 20C and a light reflection layer 30 corresponding to a single lens U. A width of a single lens is denoted by L, a distance from a flat surface of the lens layer 10 to a focal point F is denoted by S, and a width of a light reflection portion 31 corresponding to the single lens U is denoted by Wr. In addition, a depth from the lens layer 10 in the light diffusion layer 20C is denoted di, and a width of the light diffusion portion 22 at the depth di is denoted by Wi. Then, the width Wi of the light diffusion portion 22 can be set to satisfy the following condition (Formula 2).

$$Wi \leq \begin{cases} L\left(1 - \dfrac{di}{S}\right) & \ldots \text{ in case } S \geq di \\ L - 2Wr & \ldots \text{ in case } S \leq di \end{cases} \quad \text{(Formula 2)}$$

(Example of Method for Forming Lens Array Sheet 106)

Such light diffusion layer 20C may be formed, for example, as follows. First, an ultraviolet curing resin having light diffusion property is applied on a flat surface of a lens layer 10 and then an ultraviolet light is emitted from a lens surface 11 of the lens layer 10 in which the ultraviolet light has a diameter from a center of a lens U, which is equal to or smaller than a diameter of the lens U. As a result, the ultraviolet curing resin is cured as shown in FIG. 7 and FIG. 8. Thereafter, a light diffusion portion 22 is formed by removing a portion that has not been cured. Subsequently, the light diffusion layer 20C is formed by forming a transparent portion 42 between light diffusion portions 22. In addition, this light diffusion layer 20C may be formed by removing a part of a light diffusion layer 20A according to the first embodiment using a photolithography or sputtering method. Of course, the present invention is not limited by the method for forming the lens array sheet.

(Example of Advantages of Lens Array Sheet 106)

Hereinbefore, a configuration of the lens array sheet 106 and the like according to the sixth embodiments of the present invention have been described. This lens array sheet 106 can have an advantage that a shape of an interface between a light diffusion portion 22 and a transparent portion 42 has a shape following a light focusing region G in addition to the advantages achieved by the lens array sheet 103 according to the third embodiment. Therefore, a part of light diffused by the light diffusion portion 22 can be reflected by the difference in the refractive index at the interface and an amount of light directing toward a corresponding lens U can be increased. In other words, the lens array sheet 106 according to the sixth embodiment enables in effect the light to be guided toward the lens U by the interface between the light diffusion portion 22 and the transparent portion 42. Consequently, the lens array sheet 106 also enables a light use efficiency to be improved.

Hereinbefore, the embodiments (the first embodiment to the sixth embodiment) classified into one group of the present invention have been described. In the above mentioned first to sixth embodiments, it is shown that light diffusion layers 20A, 20B and 20C, and a light reflection layer 30 forms individual layers. However, a lens array sheet can be formed by embedding light reflection portions 31 of the light reflection layer 30 in the light diffusion layers 20A, 20B and 20C, respectively. In other embodiments (a seventh embodiment to a tenth embodiment) classified into the other group of the present invention, a light reflection portion is embedded in a light diffusion layer. Since the light diffusion layer is embedded with the light reflection portion in this manner, the light diffusion layer enables a light use efficiency to be improved.

Figure 9:
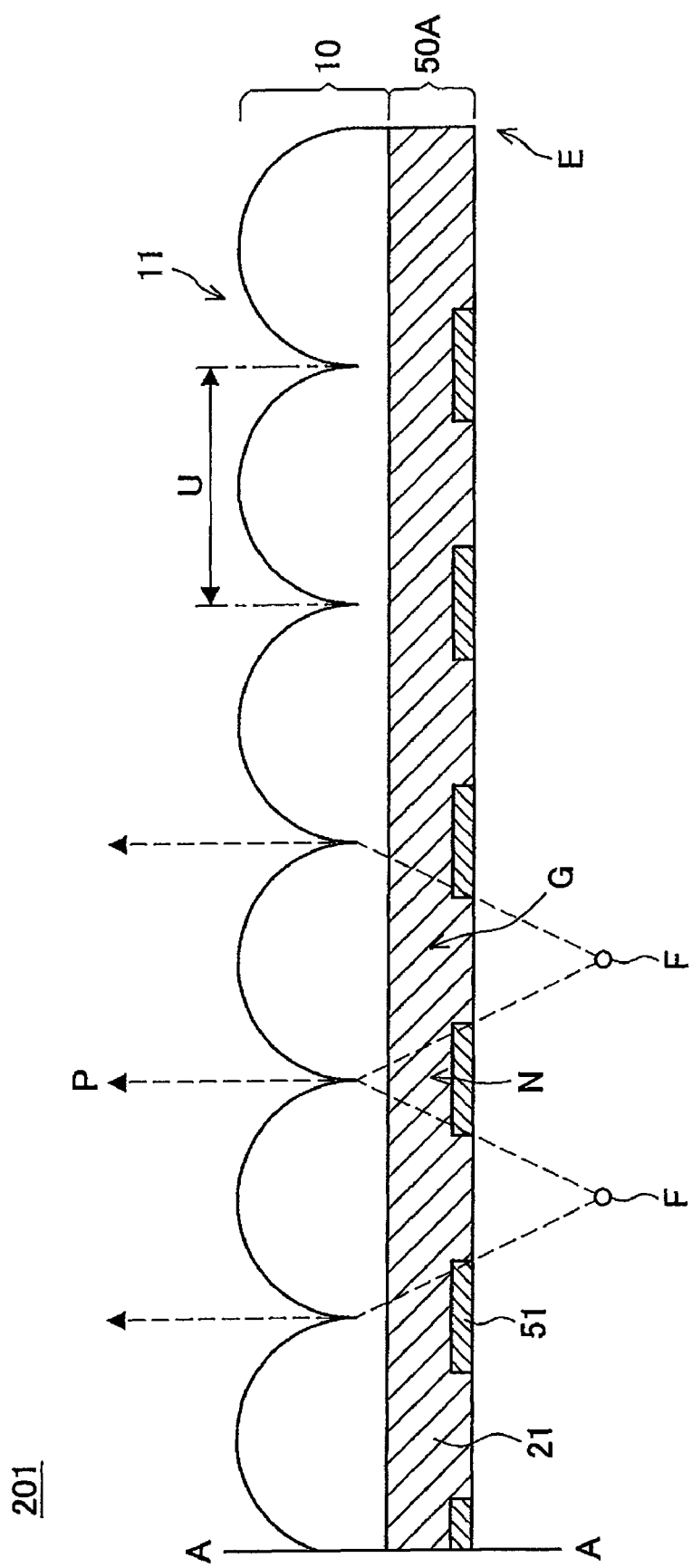
FIG. 9 is an explanatory diagram for explaining a configuration of a lens array sheet according to a seventh embodiment of the present invention.

We will describe hereinafter seventh, eighth, ninth, and tenth embodiments in detail. Referring to FIG. 9, a lens array sheet according to the seventh embodiment will now be described.

Lens Array Sheet 201 According to Seventh Embodiment

FIG. 9 is an explanatory diagram for explaining a configuration of a lens array sheet according to the seventh embodiment of the present invention.

(Configuration of Lens Array Sheet 201)

As shown in FIG. 9, a lens array sheet 201 according to this embodiment has a light diffusion layer 50A in place of a light diffusion layer 20A and a light reflection layer 30 included in a lens array sheet 101 according to the first embodiment. In addition, the light diffusion layer 50A has a light diffusion portion 21 and a light reflection portion 51. On one hand, as shown in FIG. 9, a light diffusion portion 21 according to this embodiment has a layered shape that is different from that of a light diffusion portion 21 forming a light diffusion layer 20A according to the first embodiment, and is denoted by the same reference as that in the first embodiment. On the other, thought the light reflection portion 51 according to this embodiment is denoted by a different reference from that in the first embodiment due to the fact that the light reflection portion 51 is formed by embedding it in the light diffusion layer 50A, the light reflection portion 51 may be in principle formed in the same manner as light reflection portions 31 and 32 according to the first to sixth embodiments.

The light diffusion portion 21 is laminated on a flat surface of a lens layer 10 and formed integrally with the lens layer 10. Then, the light diffusion layer 50A diffuses light passing through it.

The light reflection portion 51 is embedded in the light diffusion portion 21 at least within a part of a non-light focusing region N of a lens U. In short, the light reflection portion 51 is embedded in a plane in parallel with a lens array sheet 201 such that the light reflection portion 51 covers a light focusing region. In addition, the light reflection portion 51 reflects light passing through the non-light focusing region N and directing toward the lens layer 10.

(Example of Method for Forming Lens Array Sheet 201)

Such light diffusion layer 50A may be formed, for example, as follows. For example, first, a light diffusion portion 21 is formed on a flat surface of the lens layer 10 as a flat layered structure and a recess is formed on a back side of the light diffusion portion 21 by a lithography method or a sputtering method. The light diffusion layer 50A is then formed by applying a light reflection portion 51 on the recess. Alternatively, the light diffusion layer 50A may be formed, for example, by evenly forming a part of the light diffusion portion 21 on the flat surface of the lens layer 10, further laminating the light diffusion portion 21 having a recess of a predetermined pattern on the part of the light diffusion portion 21, and thereafter applying the light reflection portion 51 on the recess. Of course, the present invention is not limited by the method for forming the lens array sheet.

(Example of Advantages of Lens Array Sheet 201)

Hereinbefore, a configuration of the lens array sheet 201 and the like according to the seventh embodiment of the present invention have been described. This lens array sheet 201 can have an advantage that it enables a reflectance of the light reflection portion 51 to be improved, and a light use efficiency to be also improved by adjusting a thickness of the light reflection portion 51 in addition to the advantages achieved by the lens array sheet 101 according to the first embodiment. The light reflection portion 51 may serve to restrict light, which is incident on the lens layer 10, to light passing through a focal point F as in the case of the light reflection layer 30 and the like according to the first embodiment. However, though a metal material is used, for example, for the light reflection layer 30, the light reflection layer 30 enables absorption or transmission of light to be generated and a reflectance is not equal to 100%. When the reflectance is low, light actually reflected by the lens layer 10 would be reduced due to the absorption or transmission of the light at the light reflection portion 51. To the contrary, the light reflection portion 51 enables the reflectance to be improved by thickening a thickness of the light reflection portion 51. In this manner, when the thickness of the light reflection portion 31 in the first embodiment and the like is thickened, a thickness of the lens array sheet 201 by itself would be thickened. However, the thickness of the light reflection portion 51 can be easily thickened without increasing the thickness of the light reflection portion 51 by itself, when the light reflection portion 51 is embedded in the light diffusion layer 50A. In addition, it is desirable that a depth by which this light reflection portion 51 is embedded in the light diffusion layer 50A, that is to say, the thickness of the light reflection portion 51 is configured such that reflection efficiency reaches equal to or more than 70%. Furthermore, it is desirable that this thickness is configured such that a reflectance becomes equal to or more than 80%, more preferably equal to or more than 90%. In addition, it is desirable that this thickness is configured depending on a material of the light reflection portion and the like, because the thickness varies depending on its material and the like.

The lens array sheet 106 according to the sixth embodiment enables light to be guided toward a lens U using an interface between a light diffusion portion 22 and a transparent portion 42 by arranging the transparent portion 42 between light diffusion portions 22. The lens array sheet 201 according to this embodiment enables light to be guided toward a lens U using a light reflection portion 51, which has a higher efficiency than the interface, by embedding the light reflection portion 51 in the light diffusion portion 21. Therefore, embodiments will later be described that modifies a shape of the light reflection portion 51 in order to improve such light guidance effect. First, for the purpose of describing such embodiments, eighth and ninth embodiments of the present invention will be described with reference to FIGS. 10, 11 and 12.

Lens Array Sheets 202 and 203 According to Eighth and Ninth Embodiments

Figure 10:
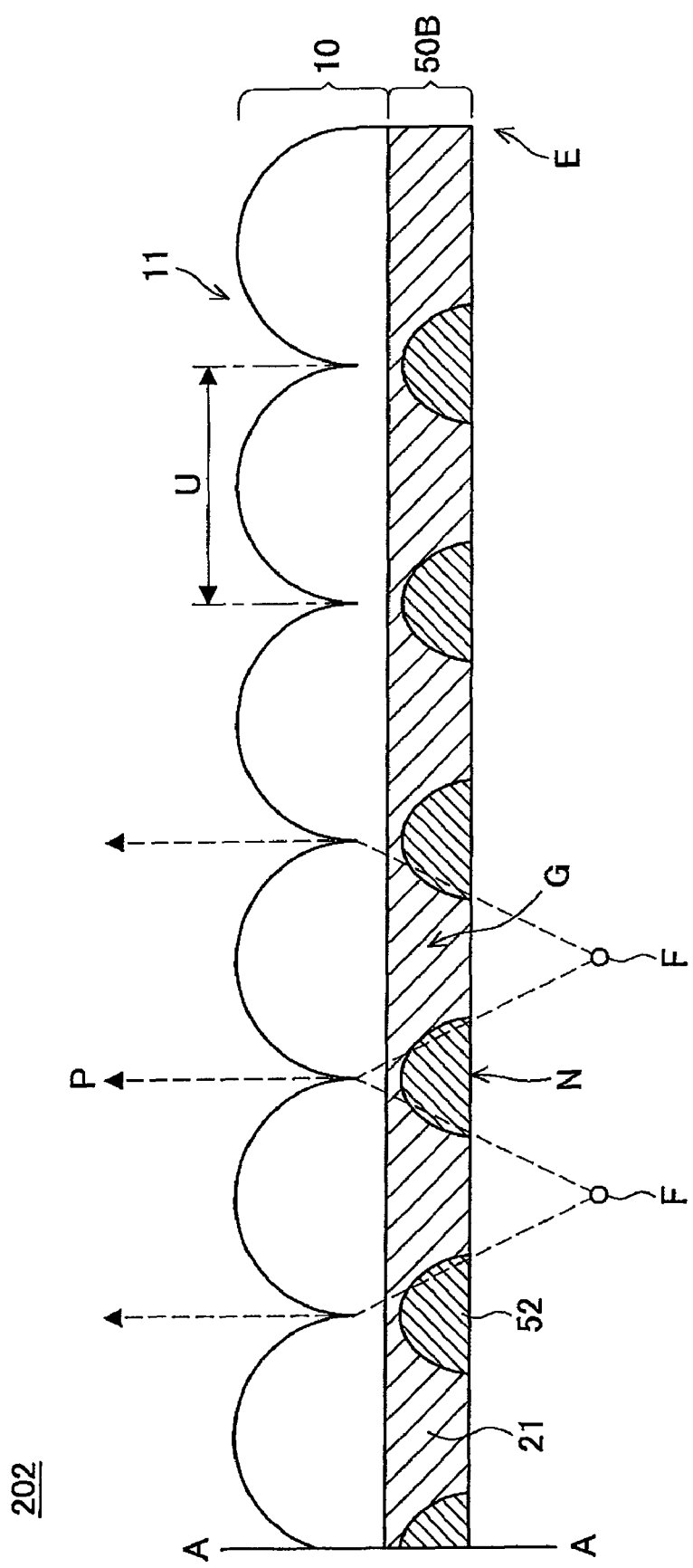
FIG. 10 is an explanatory diagram for explaining a configuration of a lens array sheet according to an eighth embodiment of the present invention.
Figure 11:
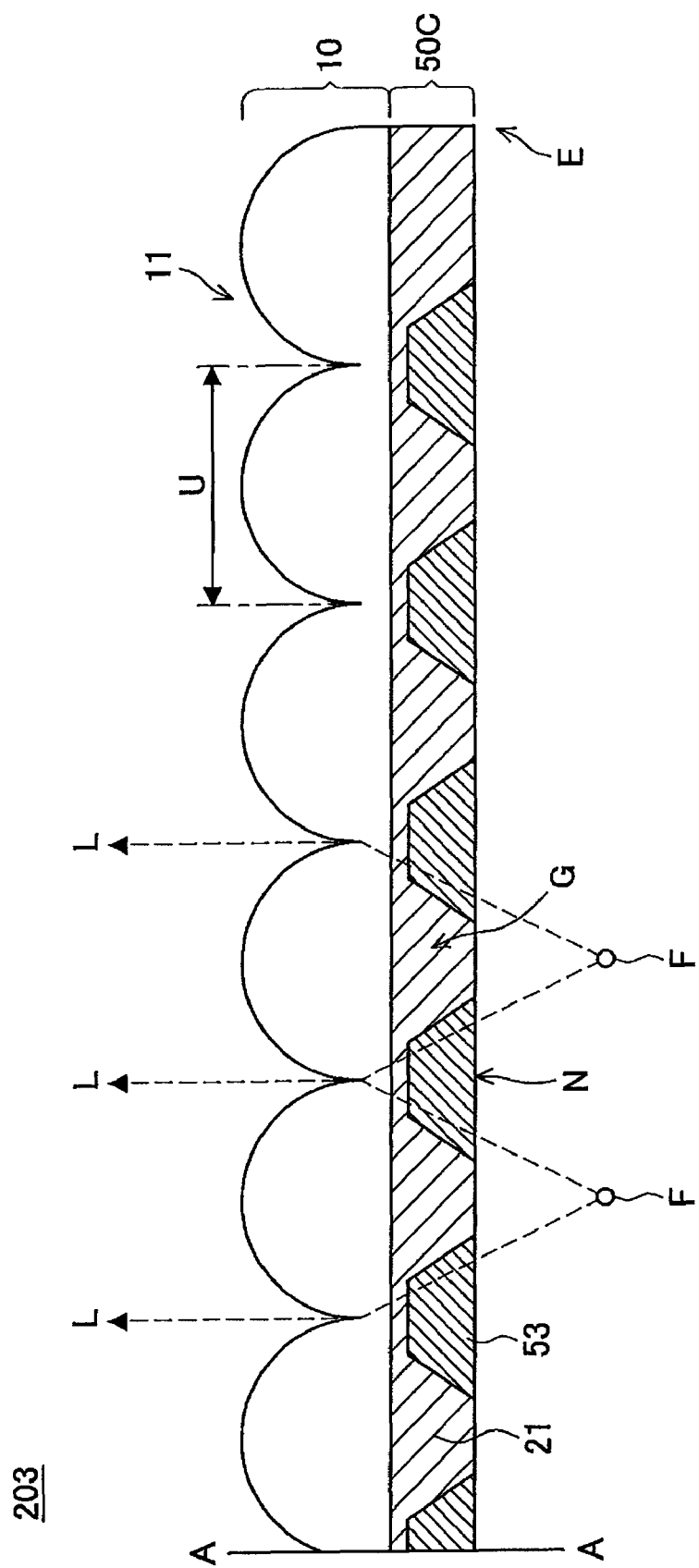
FIG. 11 is an explanatory diagram for explaining a configuration of a lens array sheet according to a ninth embodiment of the present invention.
Figure 12:
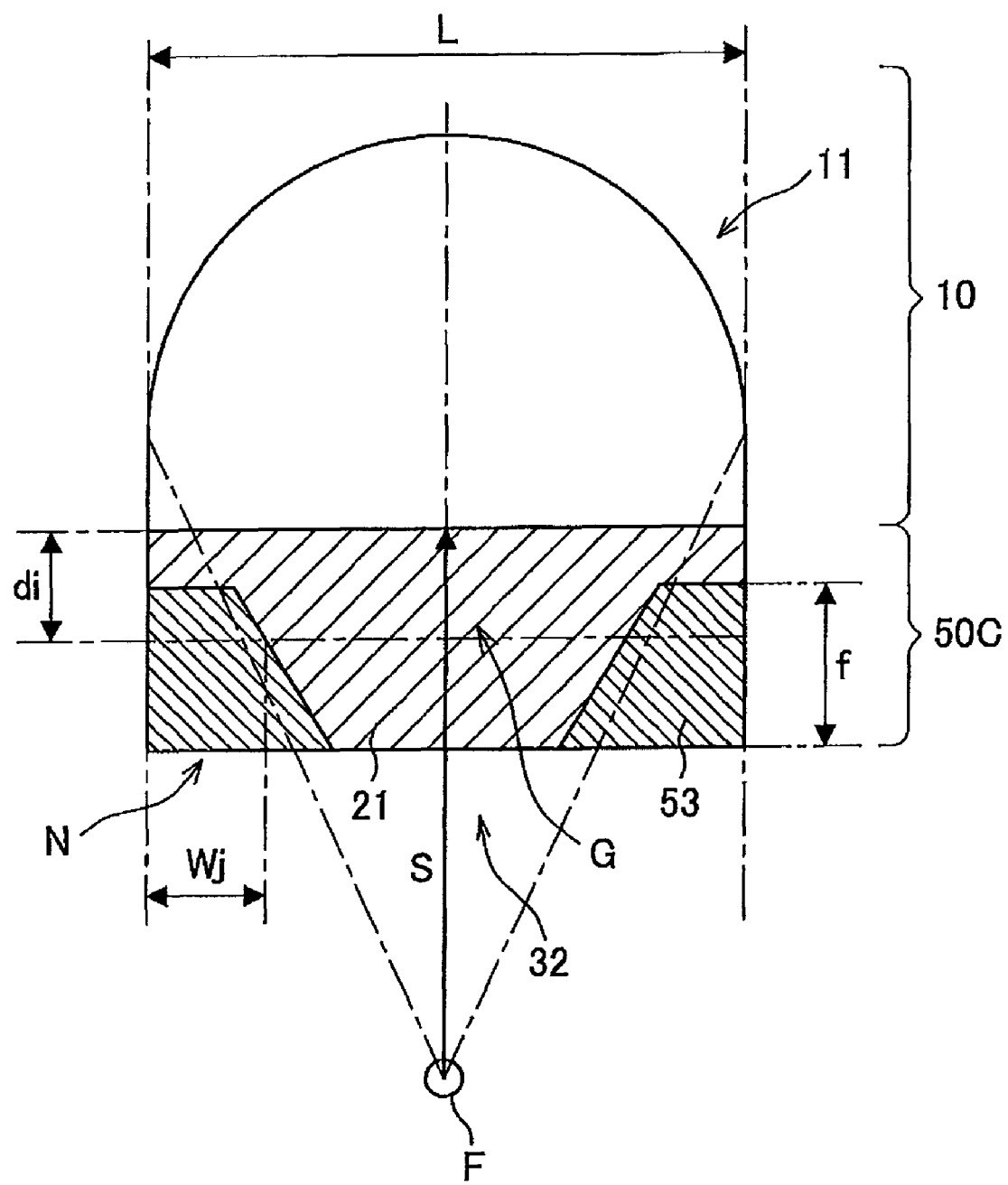
FIG. 12 is an explanatory diagram for explaining a configuration of the lens array sheet according to the embodiment.

FIG. 10 is an explanatory diagram for explaining a configuration of a lens array sheet according to an eighth embodiment of the present invention. FIG. 11 and FIG. 12 illustrate a configuration of a lens array sheet according to a ninth embodiment of the present invention.
(Configuration of Lens Array Sheets 202 and 203)

As shown in FIGS. 10 and 11, each of lens array sheets 202 and 203 has light diffusion layers 50B and 50C in place of a light diffusion layer 50A included in a lens array sheet 202 according to the seventh embodiment. In addition, these light diffusion layers 50B and 50C have light reflection portions 52 and 53, respectively, in place of a light reflection portion 51.

The light reflection portions 52 and 53 are embedded in a light diffusion portion 21 at least within a part of a non-light focusing region N of a lens U as in the case of the light reflection portion 51. In short, the light reflection portions 52 and 53 are also embedded in a plane in parallel with the lens array sheets 202 and 203 such that the light reflection portions cover a light focusing region. In addition, the light reflection portions 52 and 53 also reflect light passing through the non-light focusing region N and directing toward a lens layer 10.

In addition, each of the light reflection portions 52 and 53 has a shape (a width in a direction of a plane in each of lens array sheets 202 and 203) gradually narrowing toward the lens layer 10. In other words, each of the light reflection portions 52 and 53 has a shape following the non-light focusing region N of individual lenses U. Furthermore, the light reflection portions 52 and 53 serve to riot only reflect light passing through the non-light focusing region N and directing toward the lens layer 10, but also reflect and return light, which is diffused at a light diffusion portion 21 and departs from a light focusing region G, to the light focusing region G.
(Example of Dimensions of Lens Array Sheet 203)

Hereinbefore, a configuration of the lens array sheets 202 and 203 have been described.

Referring to FIG. 12, an example of dimensions of individual configurations in the lens array sheet 203 and the like will now be described as an example of a lens array sheet in which gradually narrowing light reflection portions 52 and 53 are embedded.

FIG. 12 illustrates a lens layer 10 and a light diffusion layer 50C corresponding to a single lens U. A width of a single lens is denoted by L and a distance from a flat surface of the lens layer 10 to a focal point F is denoted by S. In addition, a depth from the lens layer 10 in the light diffusion layer 50C is denoted di, a width of the light diffusion layer 50C at the depth di is denoted by Wj, and a depth at which a light reflection portion 53 is embedded in the light diffusion layer 50C is denoted by f. Then, the width Wj of the light reflection portion 53 can be set to satisfy the following condition (Formula 3).

$$Wj \leq \begin{cases} \dfrac{L \times dj}{2 \times S} & \text{or } Wj = 0 \quad \ldots \quad \text{in case } S \geq di \\ L\left(-\dfrac{dj}{2S}\right) & \text{or } Wj = 0 \quad \ldots \quad \text{in case } S \leq di \end{cases} \quad \text{(Formula 3)}$$

As described above, a reflectance of the light reflection portion 53 depends on the depth f at which the light reflection portion 53 is embedded in the light diffusion layer 50C. Therefore, it is desirable that this depth f is configured such that the reflectance in the light reflection portion 53 becomes equal to or more than 70%. Furthermore, it is desirable that the depth f is configured such that the reflectance reaches equal to or more than 80%, more preferably, 90%.
(Example of Method for Forming Lens Array Sheets 202 and 203)

Such light diffusion layers 50B and 50C may be formed, for example, as in the case of a light diffusion layer 50A as follows. In short, for example, a light diffusion portion 21 is initially formed in a flat layered shape on a flat surface of a lens layer 10 and a recess is then formed on a back side of the light diffusion portion 21 using a photolithography method or a sputtering method. In addition, the light diffusion layers 50B and 50C are formed by applying a light reflection portion 52 or 53 on the recess. Alternatively, the light diffusion layers 50B and 50C may be formed by forming a part of the light diffusion layer 21 on the flat surface of the lens layer 10, further laminating the light diffusion layer 21 having a recess of a predetermined pattern on the part of the light diffusion portion 21, and thereafter applying the light reflection portion 52 or 53 on the recess.

Furthermore, the light diffusion layer 50C may be formed, for example, using an ultraviolet curing resin. In this case, for example, a layered light diffusion portion 21 is initially formed, and a material that can be cured by heat and ultraviolet light is applied across the light diffusion portion 21. A lens array sheet is then arranged on the other side of the light diffusion portion 21 with a pitch similar to that of the lens layer 10, where a lens having a shorter focal distance than that of a lens U is arranged on the lens array sheet. This lens array sheet is then irradiated by light so as to be cured. Thereafter, the lens array sheet is removed, the lens layer 10 is bonded, and uncured ultraviolet curing resin is removed, so that a light reflection portion 53 is applied on a portion from which the lens array sheet has been removed. As a result, it is possible to form the light diffusion layer 50C. Of course, the present invention is not limited by the method for forming the lens array sheet.

(Example of Advantages of Lens Array Sheets 202 and 203)

Hereinbefore, a configuration of the lens array sheets 202 and 203 and the like according to the eighth and ninth embodiments of the present invention have been described. These lens array sheets 202 and 203 can have an advantage that a shape of each of the light reflection portions 52 and 53 has a shape following a non-light focusing region N in addition to the advantages achieved by the lens array sheet 103 according to the seventh embodiment. Therefore, a part of light diffused by the light diffusion portion 21 can be reflected by the light reflection portions 52 and 53, and an amount of light directing toward a corresponding lens U can be increased. In other words, the lens array sheets 202 and 203 according to the eighth and ninth embodiments, respectively, enable in effect the light to be guided toward the lens U by the light reflection portions 52 and 53. Consequently, the lens array sheets 202 and 203 also enable a light use efficiency to be improved.

The lens array sheets 202 and 203 according to the eighth and ninth embodiments, respectively, are shown such that each of the light reflection portions 52 and 53 has a width gradually narrowing toward the lens layer 10. In other words, it is shown that each of the light reflection portions 52 and 53 has a shape following the non-light focusing region N, and the light diffusion portion 21 has a shape following a light focusing region G. However, the shape of each of the light reflection portions 52 and 53 is not limited to this example, but may be further modified. Therefore, referring to FIG. 13, a tenth embodiment of the present invention will now be described in that a light reflection portion has a different shape.

Lens Array Sheet 204 According to Tenth Embodiment

Figure 13:
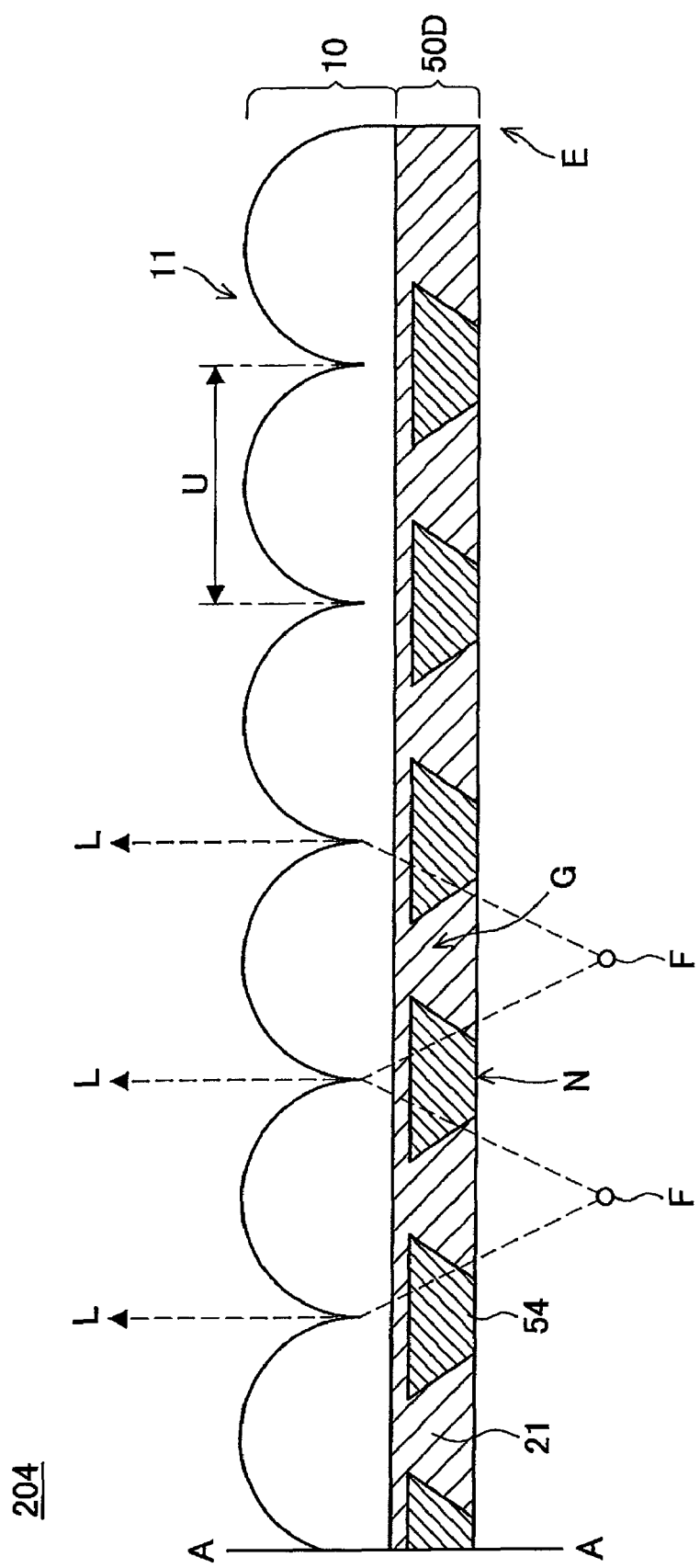
FIG. 13 is an explanatory diagram for explaining a configuration of a lens array sheet according to a tenth embodiment of the present invention.

FIG. 13 is an explanatory diagram for explaining a configuration of a lens array sheet according to a tenth embodiment of the present invention.

(Configuration of Lens Array Sheet 204)

As shown in FIG. 13, a lens array sheet 204 has light diffusion layers 50D in place of a light diffusion layer 50A included in a lens array sheet 201 according to the seventh embodiment. In addition, this light diffusion layer 50D has a light reflection portion 54 in place of a light reflection portion 51.

The light reflection portion 54 is embedded in a light diffusion portion 21 at least within a part of a non-light focusing region N of a lens U as is the case of the light reflection portion 51. In short, the light reflection portion 54 is also embedded in a plane in parallel with the lens array sheet 204 such that the light reflection portion covers a light focusing region. In addition, the light reflection portion 54 also reflects light passing through the non-light focusing region N and directing toward a lens layer 10.

In addition, the light reflection portion 54 has a shape (a width in a direction of a plane in the lens array sheet 204) gradually widening toward the lens layer 10. Furthermore, the light reflection portion 54 serves to not only reflect light passing through the non-light focusing region N and directing toward the lens layer 10, but also reflect and return light, which is diffused at a light diffusion portion 21 and departs from a light focusing region G, to the light focusing region G.

(Example of Method for Forming Lens Array Sheet 204)

Such light diffusion layer 50D may be formed, for example, using a photolithography method or a sputtering method. In this case, for example, a portion in which a light reflection portion 54 is to be embedded is previously formed. In short, a layered light diffusion portion 21 is provided and a recess is formed from a direction, in which a lens layer 10 is arranged, by the photolithography method or the sputtering method. The light reflection portion 54 is then formed in the recess, and subsequently the layered diffusion portion 21 is further laminated on the reflection portion. In addition, the lens layer 10 is bonded to the laminated layered light diffusion portion 21 to complete the lens array sheet 204.

Furthermore, the light diffusion layer 50D may be formed using an ultraviolet curing resin as in the case of the eighth and ninth embodiments. In this case, a lens layer 10 is initially formed and a layered light diffusion portion 21 is formed on a flat surface of the lens layer 10. An ultraviolet curing resin is then applied on the layered light diffusion portion 21 and subsequently a lens layer similar to the lens layer 10 is arranged at an opposite side to the lens layer 10. In addition, a part of the ultraviolet curing resin is irradiated and cured with ultraviolet light from a side of this newly arranged lens layer. Thereafter, the lens layer and the remaining uncured ultraviolet curing resin are removed. Since a recess is formed at a position from which the ultraviolet curing resin has been removed, a light reflection portion 53 is then applied on the recess. As a result, the lens array sheet is completed. Of course, the present invention is not limited by the method for forming the lens array sheet.

(Example of Advantages of Lens Array Sheet 204)

Hereinbefore, a configuration of the lens array sheet 204 and the like according to the tenth embodiment of the present invention have been described. The lens array sheets 204 can have an advantage that a width of the light reflection portion 54 is gradually widened toward the lens layer 10 in addition to the advantages achieved by the lens array sheet 103 according to the seventh embodiment. For example, a part of light passing between one light reflection portion 54 and a neighbor light reflection portion 54 (i.e., a part of light passing through "an opening") is diffused by the light reflection portion 54 and directs toward a lens U different from a lens U corresponding to the opening. In this case, the light reflection portion 54 has a shape such that an incident angle of light directing toward a direction of other lenses increases. Therefore, it is possible to reflect the light directing toward the direction of the other lenses to a light focusing region G of the primarily corresponding lens U and efficiently suppress crosstalk that is incident on the other lenses. Consequently, the lens array sheet enables a light use efficiency and conversion efficiency to generally parallel light by the lens layer 10 to be improved.

Hereinbefore, the lens array sheets according to various embodiments of the present invention have been described.

A lens array sheet incorporated a liquid display device and the like will now be described. For this purpose, lens array sheets according to the first to tenth embodiments are generally referred to as a "lens array sheet 300". Any of the lens array sheets according to the first to tenth embodiments is operable to reduce moire fringes while maintaining the image quality, as described above.

Liquid Crystal Display Device 400 According to Eleventh Embodiment

Figure 14:
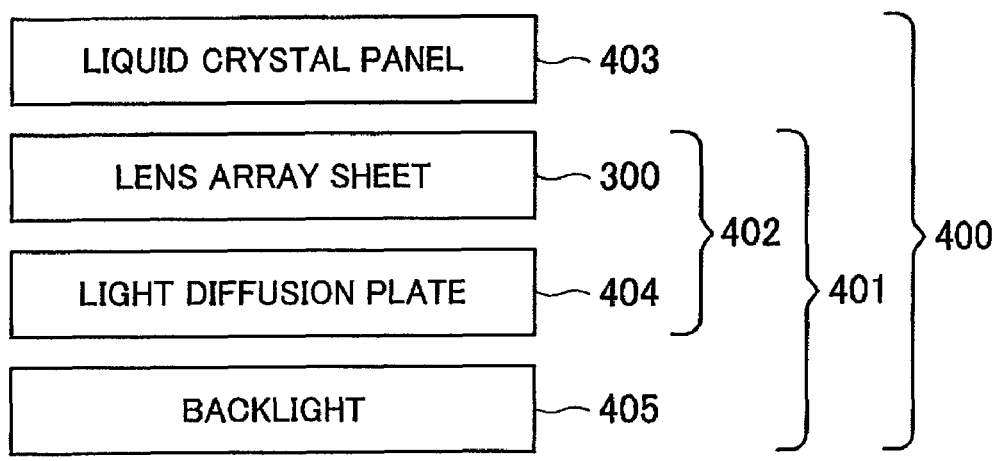
FIG. 14 is an explanatory diagram for explaining a configuration of a liquid crystal display device according to an eleventh embodiment of the present invention.

FIG. 14 is an explanatory diagram for explaining a configuration of a liquid crystal display device according to an eleventh embodiment of the present invention.

A liquid crystal display device 400 according to this embodiment has a liquid crystal panel 403 and a light source 401.

The liquid crystal panel 403 has a plurality of pixels, which are regularly arranged, and enables a predetermined image or video to be displayed by controlling transmission and blocking of light emitted from the light source 401 for each of the pixels. To this end, liquid crystal molecules are arranged in each of the pixels in the liquid crystal panel 403. In addition, a particular polarizing filter is arranged in front and in the rear of the liquid crystal molecules. Orientation of the liquid crystal molecules is changed by controlling a voltage applied to the liquid crystal molecules. As a result, transmission and blocking of the light is controlled by the polarizing filter and the orientation of the liquid crystal molecules.

The light source 401 is arranged at a back side of the liquid crystal panel and emits light to the liquid crystal panel 403. To this end, the light source 401 has a backlight 405 and an optical sheet 402.

The backlight 405 emits light (e.g., white light) to the optical sheet. The back light 405 includes, for example, but not limiting to, a discharge lamp such as a cold cathode fluorescent lamp (CCFL), an electroluminescence (EL) lamp such as a light emitting diode (LED) and the like.

The optical sheet 402 has a lens array sheet 300 and a light diffusion plate 404.

The light diffusion plate 404 is arranged in front of the backlight 405 and reduces unevenness in light intensity by diffusing light emitted from the backlight 405. In short, the light diffusion plate 404 cancels an image of a lamp and the like constituting the backlight 405, and equalizes light intensity. This diffusion plate 404 may be, for example, formed of a material similar to that of light diffusion portions 21 and 22 in the first to tenth embodiments as described above.

The lens array sheet 300 is arranged in front of the light diffusion plate 404 and just the same as the lens array sheet according to any of the first to tenth embodiments in that the lens array sheet 300 increases a component of generally parallel light in the light radiated from the light diffusion plate 404. Therefore, the lens array sheet 300 initially restricts the diffused light, which is incident from the light diffusion plate 404, to a focal point of a lens by means of a light reflection portion and the like, and increases the component of the parallel light by means of a lens layer. In short, the lens array sheet 300 increases the component of the light directing toward a front direction (normal direction) of the liquid crystal display device 400. In addition, the lens array sheet 300 supplies light to the liquid crystal panel 403. Therefore, the lens array sheet 300 enables brightness, an optical viewing angle, contrast ratio of the liquid crystal display device 400, and the like to be improved and thereby improving the image quality.

In this case, the lens array sheet 300 diffuses the light restricted by the light diffusion portion and the like and directing toward the lens layer. Therefore, the light emitted from the lens array sheet 300 is such that the component of the generally parallel light has been increased, the light has been adequately diffused, and a light and dark pattern as well as a directional pattern due to a lens pitch of the lens layer and a structured pattern of the light reflection portion and the like are reduced. As a result, a light pattern that interferes with the structured pattern of the pixels in the liquid crystal panel 403 and produce moire fringes is reduced by the lens array sheet 300. Consequently, the lens array sheet 300 is operable to improve the image quality, as described above, and suppress the moire fringes from being produced.

Hereinbefore, the liquid crystal display device 400 according to the eleventh embodiment of the present invention has been described.

Figure 15:
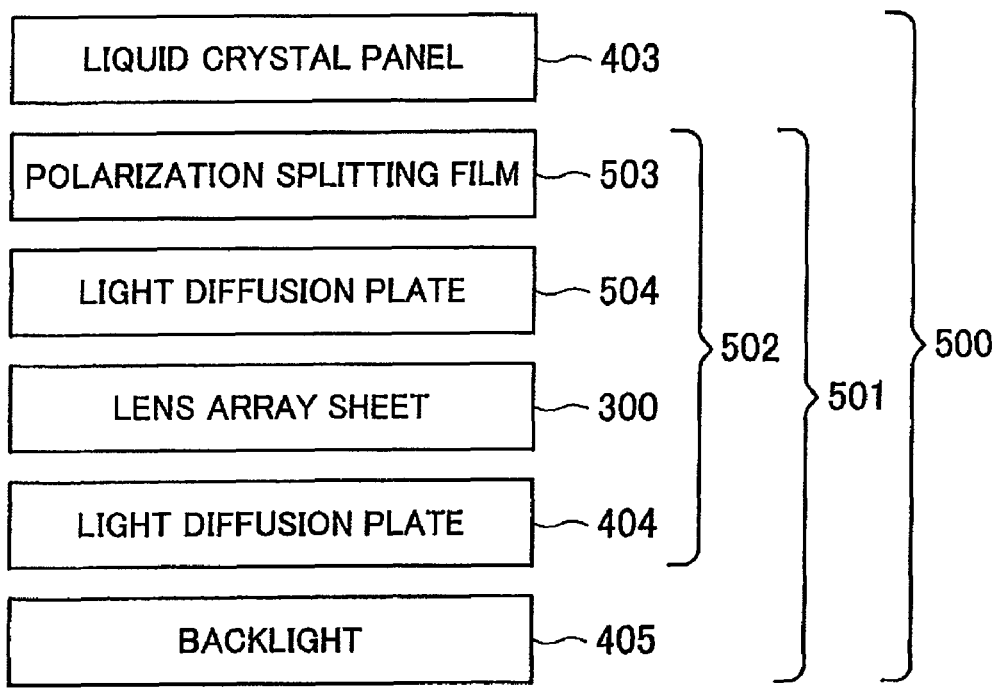
FIG. 15 is an explanatory diagram for explaining a configuration of a liquid crystal display device according to a twelfth embodiment of the present invention.

Referring to FIG. 15, a liquid crystal display device according to a twelfth embodiment of the present invention will now be described.

Liquid Crystal Display Device 400 According to Twelfth Embodiment

FIG. 15 is an explanatory diagram for explaining a configuration of the liquid crystal display device according to the twelfth embodiment of the present invention.

As shown in FIG. 15, the liquid crystal display device 500 according to the twelfth embodiment has a polarization splitting film 503 and a light diffusion film 504 in addition to the configurations incorporated in the liquid crystal display device 400 according to the eleventh embodiment. In FIG. 15, since a light source 501 and an optical sheet 502 have the polarization splitting film 503 and the light diffusion film 504, the light source 501 and the optical sheet 502 are designated by different references from those of the light source 401 and the optical sheet 402 in the liquid crystal display device 400 according to the eleventh embodiment.

The polarization splitting film 503 is arranged at a back side of a liquid crystal panel 403 and is a brightness improving film that improves brightness of the liquid crystal display device 500. For example, a film having a reflected polarization may be used for the polarization splitting film 503. A reflected polarization film transmits only light having a vibration direction in parallel with one axis in a plane, and reflects other light. Such reflected polarization film may include, for example, a brightness enhancement film such as DBEF (trade name) series and DRPF-H (trade name) series manufactured by 3M, Inc. Alternatively, a circular polarized light film may be used in place of such linear polarized light film. The circular polarized light film may include, for example, a film having a cholesteric circular polarizer such as Nipocs (trade name) manufactured by Nitto Denko Corporation.

The light diffusion film 504 is arranged between the polarization splitting film 503 and the lens array sheet 300, and diffuses light emitted from the lens array sheet 300. In addition, the light diffusion film 504 also diffuses light reflected from the polarization splitting film 503. Such light diffusion film 504 may be, for example, formed of a material similar to that of the light diffusion portions 21 and 22 in the first to tenth embodiments.

As the liquid crystal display device 500 is provided with these polarization splitting film 503 and light diffusion film 504, the liquid crystal display device 500 is also operable to improve its brightness. This brightness improving mechanism will be now described as follows. At first, light having its parallel light component, which is increased by the lens array sheet 300, is diffused by the light diffusion film 504 and is incident on the polarization splitting film 503. The polarization splitting film 503 then transmits light in a vibration direction in parallel with one axis and reflects other light. The light reflected by the polarization splitting film 503 is again incident on the light diffusion film 504. The light, which is again incident on the light diffusion film 504, is again diffused and a part of the diffused light is again incident on the polarization splitting film 503. The polarization splitting film 503 transmits once again a light in the vibration direction in parallel with the one axis and reflects the other light. In a usual liquid crystal display device, a use efficiency of front face brightness to light irradiated by a backlight reaches about 40%. However, by repeatedly transmitting and reflecting the light by the polarization splitting film 503, polarized light can be irradiated to the liquid crystal panel 403. As a result, the liquid crystal display device 500 according to this embodiment enables a light use efficiency to be improved, for example, to an extent equal to or more than 50%.

Of course, an arrangement position of the light diffusion film 504 is not limited to a position between the polarization splitting film 503 and the lens array sheet 300, but may be a position between the lens array sheet 300 and the light diffusion plate 404. In addition, since the lens array sheet 300 according to each of the various embodiments of the present invention has the light diffusion portion 21 and 22 and the like, the lens array sheet 300 is operable to serve as the light diffusion film 504. In this case, the light diffusion film 504 may be dispensed with.

Hereinbefore, the lens array sheet and the liquid crystal display device according to each of the embodiments of the present invention have been described. Examples of the lens array sheet and the liquid crystal display device will now be described.

Example

First, lens array sheets 101 to 105 according to the first to fifth embodiments, respectively, and lens array sheets 201 to 204 according to the seventh to tenth embodiments, respectively, were created. In this case, a lens layer and a transparent portion contained in each of the lens array sheets were formed of an acrylic resin and a light diffusion portion is formed of an acrylic resin having silica dispersed therein. In addition, a light reflection layer was formed of a urethane resin mixed with a white pigment. A shape of each of configurations was configured such that a haze value of each of light diffusion layers was equal to 20%.

A liquid crystal display device 400 according to the eleventh embodiment, as shown in FIG. 14, was then created for each of the lens array sheets. In this case, a backlight 405 and a light diffusion plate 404 were implemented by a backlight and a light diffusion plate of KDL-40X5000 (trade name) contained in a liquid crystal television manufactured by Sony Corporation and available in the market.

Thus, formed liquid crystal display device was subject to visual observation in order to detect whether there were any moire fringes, and front face brightness of each of the liquid crystal display devices was also measured by "CS-1000 (trade name)" manufactured by Konica Minolta Sensing, Inc.

Furthermore, liquid crystal display devices similar to the above-mentioned one, except for a lens array sheet, were provided as comparative examples. As Comparative Example 1, a liquid crystal display device having no lens array sheets was provided. As Comparative Example 2, a liquid crystal display device was provided that had a lens array sheet including a transparent layer in place of a light diffusion layer 20A in a lens array sheet 101 according to the first embodiment as shown in FIG. 1. As Comparative Example 3, a liquid crystal display device was provided that had a lens array sheet including a transparent portion in place of a light diffusion portion 21 in a lens array sheet 201 according to the seventh embodiment as shown in FIG. 9. These comparative examples were also subject to the same visual observation and measurement as those of the examples.

Table 1 shows results of the observation and the measurement.

As can be seen in Table 1, moire fringes were produced in Comparative Examples 2 and 3 where the liquid crystal display devices had no light diffusion portions 21 and the like, whereas moire fringes were suppressed from being produced in the liquid crystal display device in each of the embodiments of the present invention. It is supposed that no moire fringes were produced in the liquid crystal display device in Comparative Example 1, because no light and dark patterns interfering with a structured pattern of a liquid crystal panel were generated due to the fact that the liquid crystal display device had no lens array sheets. However, in the liquid crystal display device in Comparative Example 1, since it had no lens array sheets, the front face brightness was decreased.

In addition, it can be seen that the front face brightness in the liquid crystal display device of each of the embodiments was much improved than that of Comparative Example 1 where the liquid crystal display device had no lens array sheets. In particular, in the second to fifth embodiments, the front face brightness was further improved due to transparency achieved by transparent portions 41 and 42 and the like, and an effect of guiding light toward a lens U by an interface of each of the transparent portions. Furthermore, in the seventh to tenth embodiments, the front face brightness was further improved, because light reflection portions 51 to 54 were embedded in light diffusion layers 50A to 50B and light was further effectively guided to the lens U by means of the light reflection portion 51.

TABLE 1

| LENS SHEET EMBODIMENTS | PRODUCTION OF MOIRE | FRONT FACE BRIGHTNESS (cd/m$^2$) |
|---|---|---|
| FIRST EMBODIMENT | NO | 518 |
| SECOND EMBODIMENT | NO | 527 |
| THIRD EMBODIMENT | NO | 520 |
| FORTH EMBODIMENT | NO | 529 |
| FIFTH EMBODIMENT | NO | 531 |
| SEVENTH EMBODIMENT | NO | 533 |
| EIGHTH EMBODIMENT | NO | 551 |
| NINTH EMBODIMENT | NO | 541 |
| TENTH EMBODIMENT | NO | 536 |
| COMPARATIVE EXAMPLE 1 | NO | 505 |
| COMPARATIVE EXAMPLE 2 | YES | 535 |
| COMPARATIVE EXAMPLE 3 | YES | 571 |

Subsequently, a haze value of a light diffusion layer included in the lens array sheet according to each of the embodiments was measured. In short, five different lens array sheets were created that had the same structure as that of the lens array sheet 101 according to the first embodiment, but had light diffusion layer 20A of different haze values, respectively. Liquid crystal display devices were then formed in similar manner as described above using individual lens array sheets. In addition, the haze value of each of the lens array sheet was measured using a haze meter HR-100 (trade name) manufactured by MURAKAMI COLOR RESEARCH LABORATORY. The liquid crystal display devices including respective lens array sheets having the different haze values were also subject to the visual observation in order to detect whether there were any moire fringes and front face brightness of each of the liquid crystal display devices was also measured.

Table 2 shows results of the observation and the measurement.

As can be seen in Table 2, no moire fringes were produced, but the front face brightness was reduced in the liquid crystal display devices having the haze value more than 20%. Therefore, the light diffusion layer included in the lens array sheet according to each of the embodiments is preferably formed such that the haze value is decreased equal to or less than 20% because decrease of the front face brightness is maintained comparatively low at that haze value.

TABLE 2

| HAZE VALUE OF LIGHT DIFFUSION LAYER | PRODUCTION OF MOIRE | FRONT FACE BRIGHTNESS (cd/m²) |
| --- | --- | --- |
| 9% | NO | 527 |
| 20% | NO | 518 |
| 31% | NO | 470 |
| 42% | NO | 450 |
| 49% | NO | 421 |
| COMPARATIVE EXAMPLE 2 | YES | 535 |

Furthermore, a liquid crystal display device 500 according to the twelfth embodiment, as shown in FIG. 15, was formed and the liquid crystal display device was also subject to the observation in order to detect whether there were any the moire fringes. In this case, a brightness improving film, DBEF (trade name) series manufactured by 3M, Inc. was used as a polarization splitting film 503. As a result, production of the moire fringes was not observed in the liquid crystal display device 500. Therefore, the liquid crystal display device 500 also enables the moire fringes to be suppressed from being produced with or without the polarization splitting film 503.

The present application contains subject matter related to that disclosed in Japanese Priority Patent Application JP 2008-105980 filed in the Japan Patent Office on Apr. 15, 2008, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A lens array sheet comprising:
a lens layer having a lens surface on which a plurality of lenses are formed in an array;
a light reflection layer arranged at an opposite side to the lens surface of the lens layer and having an opening within a light focusing region in the lenses to transmit light, for reflecting light at a site other than the opening; and
a light diffusion layer arranged between the lens layer and the light reflection layer, for diffusing light, which passes through the opening and is directed toward the lens layer, and wherein the light diffusion layer includes
a plurality of light diffusion portions arranged within the light focusing region in the lenses, for diffusing the light passing through the opening and directing toward the lens layer; and
transparent portions arranged between the plurality of light diffusion portions, for transmitting the light.

2. The lens array sheet according to claim 1, wherein each of the light diffusion portions has a shape such that a width of the shape gradually widens toward the lens layer.

3. The lens array sheet according to claim 1, wherein the lens array sheet further comprises a transparent layer arranged between the light diffusion layer and the light reflection layer, for transmitting the light.

4. The lens array sheet according to claim 1, wherein the lens array sheet further comprises a transparent layer arranged between the lens layer and the light diffusion layer, for transmitting the light.

5. The lens array sheet according to claim 1, wherein a haze of the light diffusion layer is equal to or less than 20%.

6. The lens array sheet according to claim 1, wherein the light reflection layer is a scatter and reflection layer for scattering light in order to reflect the light.

7. The lens array sheet according to claim 1, wherein the light reflection layer is not formed at least around the lens array sheet.

8. The lens array sheet according to claim 1, wherein a lenticular lens is formed on the lens surface of the lens layer and the lenticular lens includes a plurality of convex shapes arranged in parallel to each other and at a predetermined distance.

9. A light source comprising:
a lens array sheet having a lens surface on which a plurality of lenses are formed in an array; and
a backlight arranged at an opposite side to the lens surface of the lens array sheet, for emitting light on the lens array sheet,
wherein the lens array sheet includes:
a lens layer having the lens surface;
a light reflection layer arranged at an opposite side to the lens surface of the lens layer and having an opening within a light focusing region in the lenses to transmit the light emitted from the backlight, for reflecting light at a site other than the opening; and
a light diffusion layer arranged between the lens layer and the light reflection layer, for diffusing the light passing through the opening and directing toward the lens layer,
wherein the light diffusion layer includes
a plurality of light diffusion portions arranged within the light focusing region in the lenses, for diffusing the light passing through the opening and directing toward the lens layer; and
transparent portions arranged between the plurality of light diffusion portions, for transmitting the light.

10. The light source according to claim 9, wherein each of the light diffusion portions has a shape such that a width of the shape gradually widens toward the lens layer.

11. The light source according to claim 9, wherein the lens array sheet further comprises a transparent layer arranged between the light diffusion layer and the light reflection layer, for transmitting the light.

12. The light source according to claim 9, wherein the lens array sheet further comprises a transparent layer arranged between the lens layer and the light diffusion layer, for transmitting the light.

13. The light source according to claim 9, wherein the light reflection layer is a scatter and reflection layer for scattering light in order to reflect the light.

14. The light source according to claim 9, wherein
a lenticular lens is formed on the lens surface of the lens layer and the lenticular lens includes a plurality of convex shapes arranged in parallel to each other and at a predetermined distance.

15. A liquid crystal display device comprising:
a lens array sheet arranged between a liquid crystal panel and a backlight emitting light on the liquid crystal panel and having, at a side of the liquid crystal panel, a lens surface on which a plurality of lenses are formed in an array,
wherein the lens array sheet includes:
a lens layer having the lens surface;
a light reflection layer arranged at an opposite side to the lens surface of the lens layer and having an opening within a light focusing region in the lenses to transmit the light emitted from the backlight, for reflecting light at a site other than the opening; and
a light diffusion layer arranged between the lens layer and the light reflection layer, for diffusing the light passing through the opening and directing toward the lens layer,
wherein the light diffusion layer includes
a plurality of light diffusion portions arranged within the light focusing region in the lenses, for diffusing the light passing through the opening and directing toward the lens layer; and
transparent portions arranged between the plurality of light diffusion portions, for transmitting the light.

16. The liquid crystal display device according to claim 15, wherein
each of the light diffusion portions has a shape such that a width of the shape gradually widens toward the lens layer.

17. The liquid crystal display device according to claim 15, wherein
the lens array sheet further comprises a transparent layer arranged between the light diffusion layer and the light reflection layer, for transmitting the light.

18. The liquid crystal display device according to claim 15, wherein
the lens array sheet further comprises a transparent layer arranged between the lens layer and the light diffusion layer, for transmitting the light.

19. The liquid crystal display device according to claim 15, wherein
the light reflection layer is a scatter and reflection layer for scattering light in order to reflect the light.

20. The liquid crystal display device according to claim 15, wherein
a lenticular lens is formed on the lens surface of the lens layer and the lenticular lens includes a plurality of convex shapes arranged in parallel to each other and at a predetermined distance.

* * * * *